(12) United States Patent
Lacombe et al.

(10) Patent No.: US 8,524,844 B2
(45) Date of Patent: Sep. 3, 2013

(54) METHOD OF CONTROLLING POLYMER ARCHITECTURE

(75) Inventors: Yves Lacombe, Calgary (CA); Victoria Ker, Calgary (CA); Peter Phung Minh Hoang, Calgary (CA); Patrick Evans, Calgary (CA)

(73) Assignee: Nova Chemicals (International) S.A., Fribourg (CH)

( * ) Notice: Subject to any disclaimer, the term of this patent is extended or adjusted under 35 U.S.C. 154(b) by 74 days.

(21) Appl. No.: 13/136,127

(22) Filed: Jul. 22, 2011

(65) Prior Publication Data

US 2012/0041147 A1    Feb. 16, 2012

(51) Int. Cl.
| C08F 4/649 | (2006.01) |
| C08F 4/606 | (2006.01) |
| C08F 4/646 | (2006.01) |
| C08F 4/6592 | (2006.01) |
| C08F 4/69 | (2006.01) |

(52) U.S. Cl.
USPC ........... 526/113; 526/135; 526/138; 526/160; 526/943; 502/113; 502/120; 502/152

(58) Field of Classification Search
USPC .................. 526/113, 114, 135, 138, 160, 943; 502/113, 120, 152; 525/240
See application file for complete search history.

(56) References Cited

U.S. PATENT DOCUMENTS

| | | | |
|---|---|---|---|
| 2,825,721 A | 3/1958 | Hogan et al. | |
| 3,023,203 A | 2/1962 | Dye et al. | |
| 3,622,521 A | 11/1971 | Hogan et al. | |
| 4,011,382 A | 3/1977 | Levine et al. | |
| 4,543,399 A | 9/1985 | Jenkins, III et al. | |
| 4,588,790 A | 5/1986 | Jenkins, III et al. | |
| 4,701,432 A | 10/1987 | Welborn, Jr. | |
| 4,808,561 A | 2/1989 | Welborn, Jr. | |
| 4,935,397 A | 6/1990 | Chang | |
| 4,937,301 A | 6/1990 | Chang | |
| 5,028,670 A | 7/1991 | Chinh et al. | |
| 5,057,475 A | 10/1991 | Canich et al. | |
| 5,064,802 A | 11/1991 | Stevens et al. | |
| 5,096,867 A | 3/1992 | Canich et al. | |
| 5,132,380 A | 7/1992 | Stevens et al. | |
| 5,292,845 A | 3/1994 | Kawasaki et al. | |
| 5,324,800 A | 6/1994 | Welborn, Jr. | |
| 5,352,749 A | 10/1994 | DeChellis et al. | |
| 5,405,922 A | 4/1995 | DeChellis et al. | |
| 5,434,116 A | 7/1995 | Sone et al. | |
| 5,525,678 A | 6/1996 | Mink et al. | |
| 5,554,775 A | 9/1996 | Krishnamurti et al. | |
| 5,633,394 A | 5/1997 | Welborn, Jr. | |
| 5,637,659 A | 6/1997 | Krishnamurti et al. | |
| 5,703,187 A | 12/1997 | Timmers | |
| 5,723,399 A * | 3/1998 | Takemoto et al. | 502/113 |
| 5,783,512 A | 7/1998 | Jacobsen et al. | |
| 5,834,393 A | 11/1998 | Jacobsen et al. | |
| 5,965,677 A | 10/1999 | Stephan et al. | |
| 6,002,033 A | 12/1999 | Razavi et al. | |
| 6,013,595 A | 1/2000 | Lhost et al. | |
| 6,034,021 A | 3/2000 | Wilson et al. | |
| 6,087,293 A | 7/2000 | Carnahan et al. | |
| 6,103,657 A | 8/2000 | Murray | |
| 6,271,325 B1 | 8/2001 | McConville et al. | |
| 6,274,684 B1 | 8/2001 | Loveday et al. | |
| 6,284,849 B1 * | 9/2001 | Almquist et al. | 526/82 |
| 6,300,438 B1 | 10/2001 | McConville | |
| 6,300,439 B1 | 10/2001 | McConville | |
| 6,303,719 B1 | 10/2001 | Murray et al. | |
| 6,309,997 B1 | 10/2001 | Fujita et al. | |
| 6,320,002 B1 | 11/2001 | Murray et al. | |
| 6,399,535 B1 | 6/2002 | Shih et al. | |
| 6,399,724 B1 | 6/2002 | Matsui et al. | |
| 6,410,474 B1 | 6/2002 | Nowlin et al. | |
| 6,417,304 B1 | 7/2002 | McConville et al. | |
| 6,489,413 B1 | 12/2002 | Floyd et al. | |
| 6,541,581 B1 | 4/2003 | Follestad et al. | |
| 6,559,090 B1 | 5/2003 | Shih et al. | |
| 6,583,083 B2 | 6/2003 | Murray et al. | |
| 6,593,266 B1 | 7/2003 | Matsui et al. | |
| 6,610,799 B1 | 8/2003 | Follestad et al. | |
| 6,686,306 B2 | 2/2004 | Shih | |
| 6,689,847 B2 | 2/2004 | Mawson et al. | |
| 6,734,131 B2 | 5/2004 | Shih et al. | |
| 6,770,723 B2 | 8/2004 | Fujita et al. | |
| 6,828,395 B1 | 12/2004 | Ehrman et al. | |
| 6,958,375 B2 | 10/2005 | Shih et al. | |
| 6,982,304 B2 | 1/2006 | Mure et al. | |
| 6,995,219 B2 | 2/2006 | Follestad et al. | |

FOREIGN PATENT DOCUMENTS

| | | |
|---|---|---|
| CA | 2605044 A1 | 4/2009 |
| CA | 2605077 A1 | 4/2009 |
| EP | 339571 B1 | 2/1994 |
| EP | 640625 A2 | 3/1995 |
| WO | WO 97/04015 A1 | 2/1997 |
| WO | WO 00/02929 A1 | 1/2000 |
| WO | WO 2005/121239 A2 | 12/2005 |
| WO | WO 2007/012406 A1 | 2/2007 |

OTHER PUBLICATIONS

Catalysts, Supported, Kirk-Othner Encylopedia of Chemical Technology, published online Nov. 15, 2002, John Wiley & Sons, Inc., vol. 5, pp. 322-344.
ASTM D6474-99 (reapproved 2006), Standard test method for determining molecular weight distribution and molecural weight averages of polyofefins, pp. 1-6.
James C Randall, A review of high resolution liquid carbon NMR characterizations of ethylene-based polymers, JMS—Rev. Macromol. Chem. Phys., C29(2 & 3) 1989, pp. 201-317.
Broyer et al, Analysis of molecular weight distribution using multicomponent models, ACS Symposium Series, 1982 vol. 197, pp. 45-64.

* cited by examiner

*Primary Examiner* — Caixia Lu
(74) *Attorney, Agent, or Firm* — Kenneth H Johnson

(57) ABSTRACT

Carbon dioxide is used to control the ratio of polymer components in a polyethylene composition made using a combination catalyst comprising a chromium catalyst, a single site catalyst and one or more activators.

19 Claims, 1 Drawing Sheet

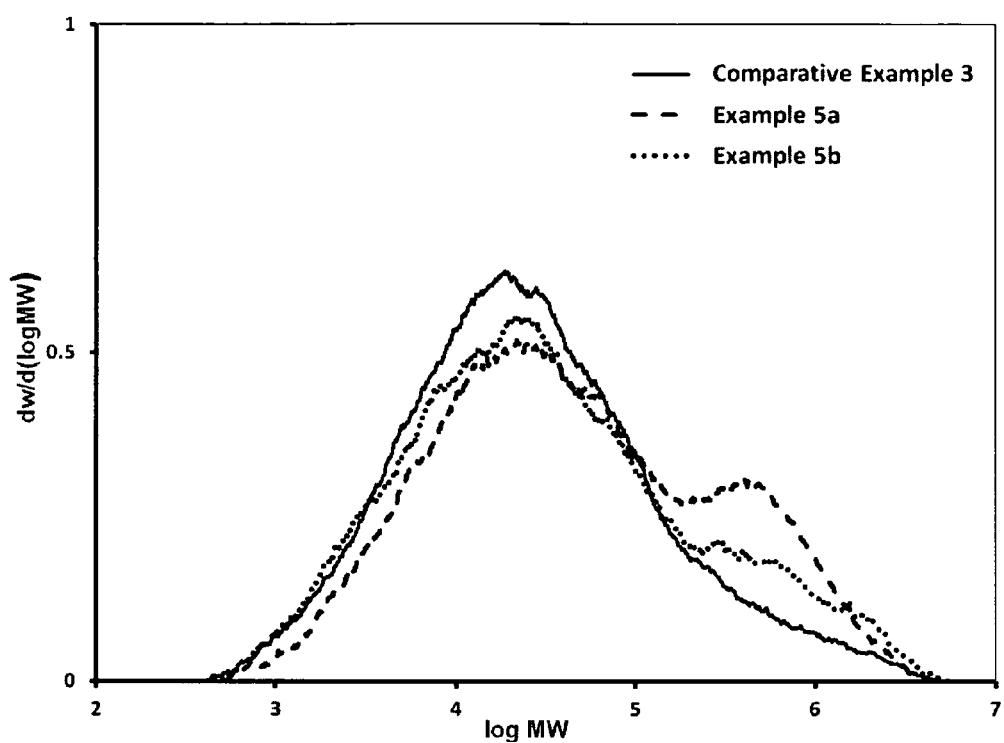

METHOD OF CONTROLLING POLYMER ARCHITECTURE

FIELD OF THE INVENTION

The present invention relates to the field of ethylene polymerization by dual or multi component catalyst systems. Taught is a process employing a combination catalyst to homopolymerize or copolymerize ethylene and which uses carbon dioxide to control the ratio of polymer components present in a polymer composition.

BACKGROUND OF THE INVENTION

Methods to make polyethylene compositions comprising two (or more) polymer components, for example high and low molecular weight components, are well known in the art. These types of polymers, known generally as bimodal or multimodal polymers, can be useful for a huge range of applications which span from low density film, to high density pressure pipe.

One method to make such compositions involves taking two different ethylene polymers, for example polymers which differ in molecular weight and/or comonomer content, and blending them in a post-reactor extrusion or melt blending process. Another well known process involves using a polymerization catalyst in two sequentially arranged polymerization zones, where each zone provides distinct conditions, such as high and low concentrations of hydrogen, to form in situ, a blend of low and high molecular weight polymers respectively.

Multi-component blends can also be made in a single reactor by using at least two polymerization catalysts which provide divergent polymers under the same set of reactor conditions. Such multi component catalysts have taken many forms over the years and most typically involve mixed Ziegler-Natta catalysts, mixed Ziegler-Natta and single site catalysts (such as metallocene catalysts) or mixed single site catalysts.

Mixed catalysts consisting of a chromium catalyst and a so called "single site catalyst" have also been explored, but to a lesser extent. For example, E.P. Pat. No. 339, 571 discloses catalyst systems for use in the gas phase and which involve the combination of a chrome oxide catalyst and a metallocene catalyst. The catalyst components were supported on a silica support. Similarly, in U.S. Pat. No. 6,541,581, a chrome oxide catalyst is co-supported with a zirconocene catalyst on an inorganic oxide support.

In U.S. Pat. No. 5,723,399 a chromium catalyst, such as a silyl chromate catalyst, is combined with a metallocene or a constrained geometry catalyst in a single reactor. The catalyst components were co-supported on a silica support or alternatively, a metallocene or constrained geometry catalyst was added to a supported chromium catalyst in situ.

Catalysts comprising a silyl chromate catalyst and a group 4 single site catalyst which has at least one phosphinimide or ketimide ligand have been disclosed in commonly assigned Canadian Pat. Appl. Nos 2,605,044 and 2,605,077.

For multi component catalysts the use of process control knobs such as hydrogen concentration to control melt index and other resin specifications can be a challenge and can lead to undesirable polymer compositions, since each catalyst component will typically have a different response to the parameter being changed. For example, a bimodal or multimodal polymer may become unimodal at different hydrogen concentrations due to the different hydrogen response of each catalyst component present. Mitigation of unintended fluctuations in polymerization conditions, such as temperature excursions or impurity levels is also a challenge with multi component catalysts, as each parameter change may have a differential impact on the performance of each catalyst species present. For systems in which distinct catalysts are fed separately to a polymerization zone, it is sometimes possible to control polymer characteristics (e.g. melt index, polydispersity, comonomer distribution, etc.) by changing the relative amounts of each catalyst present in the polymerization zone. However, multi component catalysts are often co-supported, especially for use in gas phase or slurry phase polymerization in order to make well mixed or homogeneous polymer compositions. For co-supported catalyst systems, the amount of polymer produced by each catalyst species is generally fixed by the initial ratio of catalyst components present on a support. It is therefore desirable to have methods which can attenuate product drift or to control polymer compositions made with a multi component catalyst, without having to reformulate the catalyst.

In-situ methods which alter polymer compositions made by a co-supported multi catalyst formulation have been explored. One manner in which the polymer compositions have been controlled has been to use a so called "make up catalyst". In U.S. Pat. No. 6,410,474, this involves the addition of a separate catalyst which is of same type as one catalyst species present in a multi catalyst system. This allows one to increase the amount of polymer made by one or the other of the catalyst species of the multi catalyst system. In this way, the ratio of polymer components can be altered in situ. The separate feeding of two multi component catalysts, each having a different ratio of catalyst species has also been used to control the polymer composition in situ, as is disclosed in U.S. Pat. Nos. 6,462,149 and 6,610,799. These methods suffer from the need for an additional catalyst delivery stream and can produce polymers having poor homogeneity, since the separate addition of a make-up catalyst will initiate growth of a separate polymer particle.

Another in-line method to control co-supported multi component catalysts, is to change the relative activities of each active species by the introduction of a catalyst poison. As described in U.S. Pat. No. 5,525,678, catalysts composed of a Ziegler-Natta and metallocene species can be controlled through the introduction of carbon dioxide or water.

Similarly, U.S. Pat. No. 6,828,395 teaches the use of "control agents" such alcohols, ethers, amines, or oxygen to alter the properties of a bimodal polymer made by a "bimetallic catalyst". To make the bimetallic catalyst, a Ziegler-Natta catalyst was co-supported with a metallocene catalyst.

In U.S. Pat. No. 6,995,219, a series of "adjuvants" were explored, for their ability to modify the relative activities of bridged and unbridged metallocenes which were used in a "multi-site" catalyst formulation. The adjuvants which were selected from the group consisting of phosphines, phosphites, acetylenes, dienes and acetyls, preferentially decreased the activity of the bridged metallocene, which had the effect of lowering the ratio of high to low molecular weight components produced during polymerization. In addition to modifying activity, the adjuvants also changed the molecular weight performance of each catalyst species. This is not always desirable, and it would be useful if the relative amounts, and the relative molecular weights of different polymer components could be controlled independently.

Canadian Pat. Appl. No. 2,616,053AA demonstrates the effect of adding water or carbon dioxide to a "hybrid" catalyst comprising a late transition metal catalyst and a metallocene catalyst. Water had the effect of reducing the relative activity of the late transition metal catalyst which made a low molecular weight component, while carbon dioxide reduced the relative activity of the metallocene catalyst responsible for making a high molecular weight component. In this way, water and carbon dioxide were used to increase and decrease the high to low molecular weight ratio respectively, of polymer components made in a single reactor. Although further gas phase catalyst types are broadly disclosed, including chromium catalysts, there is no teaching of the relative effects of carbon dioxide on chromium catalysts and group 4 based single site catalysts.

In light of the above, there remains a need for methods to control the performance of other mixed or multi component catalyst systems, especially systems which comprise a chromium catalyst in combination with a group 4 single site catalyst.

SUMMARY OF INVENTION

We have now discovered that carbon dioxide has a divergent effect on the activity of chromium catalysts and group 4 single site catalysts, particularly group 4 single site catalysts having at least one phosphinimide ligand. We have found that by changing the level of carbon dioxide present while polymerizing ethylene with a combination catalyst comprising chromium and a group 4 single site catalyst, one can alter the ratio of polymer components made by each catalyst species.

We have further discovered that carbon dioxide has little effect on the molecular weight of polymers made by a chromium catalyst and a group 4 single site catalyst. Hence, the process of the current invention allows one to control the relative amounts of for example, high and low molecular weight components and/or high and low comonomer content components, made by a combination catalyst, without significantly affecting the relative molecular weights of the polymer components.

The invention provides a process to co-polymerize ethylene and at least one co-monomer using a combination catalyst to provide a polymer composition comprising a first polymer component and a second polymer component wherein the process comprises: controlling the ratio of the first polymer component to the second polymer component by altering the amount of carbon dioxide present; wherein the combination catalyst comprises: a chromium catalyst, a group 4 single site catalyst, and one or more catalyst activators; further provided that the chromium catalyst provides the first polymer component and the group 4 single site catalyst provides the second polymer component.

The invention provides a process to co-polymerize ethylene and at least one co-monomer using a combination catalyst to provide a polymer composition comprising a first polymer component and a second polymer component wherein the process comprises: controlling the ratio of the first polymer component to the second polymer component by altering the amount of carbon dioxide present in a polymerization zone; wherein the combination catalyst comprises: a chromium catalyst, a group 4 single site catalyst, and one or more catalyst activators; further provided that a) the chromium catalyst is less sensitive to carbon dioxide in terms of activity than the group 4 single site catalyst and provides the first polymer component and b) the group 4 single site catalyst is more sensitive to carbon dioxide in terms of activity than the chromium catalyst and provides the second polymer component.

Provided is a process to co-polymerize ethylene and at least one co-monomer using a combination catalyst to provide a polymer composition comprising a first polymer component and a second polymer component wherein the process comprises: controlling the ratio of the first polymer component to the second polymer component by altering the amount of carbon dioxide present in a polymerization zone; wherein lowering the level of carbon dioxide in the polymerization zone decreases the ratio of the first polymer component to the second polymer component, and raising the level of carbon dioxide in the polymerization zone increases the ratio of the first polymer component to the second polymer component; wherein the combination catalyst comprises: a chromium catalyst, a group 4 single site catalyst, one or more catalyst activators, and optionally one or more support; and wherein the chromium catalyst provides the first polymer component and the group 4 single site catalyst provides the second polymer component.

The invention provides a process to co-polymerize ethylene and at least one co-monomer using a combination catalyst to provide a polymer composition comprising a first polymer component and a second polymer component wherein the process comprises: controlling the ratio of the first polymer component to the second polymer component by altering the amount of carbon dioxide present in a polymerization zone; wherein the combination catalyst comprises: a chromium catalyst, a group 4 single site catalyst having at least one phosphinimide ligand, and one or more catalyst activators; wherein the chromium catalyst provides the first polymer component and the group 4 single site catalyst having at least one phosphinimide ligand provides the second polymer component.

Provided is a continuous process to copolymerize ethylene and a co-monomer using a dual catalyst to provide a polymer composition comprising a first polymer component and a second polymer component wherein the continuous process comprises: controlling the ratio of the first polymer component to the second polymer component by conducting the process in the presence of between 0 or 0.001 molar ppm and 500 molar ppm of carbon dioxide; wherein lowering the level of carbon dioxide in molar ppm from a first higher level to a second lower level, decreases the ratio of the first polymer component to the second polymer component, and raising the level of carbon dioxide in molar ppm from a first lower level to a second higher level, increases the ratio of the first polymer component to the second polymer component; provided that the dual catalyst comprises: a chromium catalyst, a group 4 single site catalyst, one or more catalyst activators, and a support; wherein, the chromium catalyst provides the first polymer component and the group 4 single site catalyst provides the second polymer component.

The invention provides a process to polymerize ethylene and optionally a co-monomer with a combination catalyst, the process providing a polymer composition comprising a first polymer component and a second polymer component, wherein the processes comprises controlling the ratio of the first polymer component to the second polymer component by conducting the process in the presence of between 0 or 0.001 ppm and 500 ppm of carbon dioxide. The combination catalyst comprises a chromium catalyst, a group 4 single site catalyst; one or more catalyst activators, and optionally at least one support. The first and second polymer components may be of similar or different molecular weights and have similar or different comonomer contents.

In a specific aspect of the inventive process, the chromium catalyst provides a polymer component having a relatively lower comonomer content and the group 4 single site catalyst provides a polymer component having a relatively higher comonomer content.

In a specific aspect of the inventive process, the chromium catalyst provides a relatively lower weight average molecular weight (Mw) component of a polymer composition and the group 4 single site catalyst provides a relatively higher weight average molecular weight (Mw) component of a polymer composition.

In an aspect of the invention, the chromium catalyst provides a polymer component having a relatively lower comonomer content and weight average molecular weight, and the group 4 single site catalyst provides a polymer component having a relatively higher comonomer content and weight average molecular weight.

In an embodiment of the invention, the group 4 single site catalyst has at least one phosphinimide ligand.

In an embodiment of the invention, the group 4 single site catalyst has the formula: $Cp(PI)MX_2$; where Cp is a cyclopentadienyl type ligand, PI is a phosphinimide ligand, M is Ti, Zr or Hf, and each X independently, is an activatable ligand.

In an embodiment of the invention, the chromium catalyst is a silyl chromate catalyst or a chrome oxide catalyst.

In an embodiment of the invention, the chromium catalyst is a silyl chromate catalyst.

In an aspect of the inventive process, the combination catalyst used includes a chromium catalyst, a group 4 single site catalyst, one or more catalyst activators, and one or more supports. In another aspect of the invention, the combination catalyst used is a dual catalyst in which a chromium catalyst, a group 4 single site catalyst and one or more catalyst activators are co-immobilized on a support. In another aspect of the invention, the combination catalyst is a mixed catalyst in which a chromium catalyst, and a group 4 single site catalyst are independently immobilized on one or more separate supports.

The current invention allows for in-line polymer composition modification without the need to reformulate a combination catalyst recipe. For example, the present invention provides a continuous polymerization process in which increasing the level of carbon dioxide in a polymerization zone, decreases the relative amount of polymer made by a group 4 single site catalyst present in a combination catalyst also comprising a chromium catalyst, and one or more activators. Conversely, the present invention provides a continuous polymerization process in which decreasing the level of carbon dioxide in a reactor system, increases the relative amount of polymer made by a group 4 single site catalyst present in a combination catalyst also comprising a chromium catalyst and one or more activators.

Another aspect of the invention is a continuous process to copolymerize ethylene and a co-monomer with a dual catalyst to provide a polymer composition comprising a first polymer component and a second polymer component wherein the continuous process comprises: controlling the ratio of the first polymer component to the second polymer component by conducting the process in the presence of between 0 or 0.001 molar ppm and 500 molar ppm of carbon dioxide; wherein lowering the level of carbon dioxide in molar ppm from a first higher level to a second lower level, decreases the ratio of the first polymer component to the second polymer component, and increasing the level of carbon dioxide in molar ppm from a first lower level to a second higher level, increases the ratio of the first polymer component to the second polymer component; so long as the dual catalyst comprises: a chromium catalyst, a group 4 single site catalyst having at least one phosphinimide ligand, one or more catalyst activators, and a support, wherein the chromium catalyst provides the first polymer component and the group 4 single site catalyst having at least one phosphinimide ligand provides the second polymer component.

In a specific embodiment of the invention, the combination catalyst is a dual catalyst comprising: a silyl chromate catalyst; a group 4 single site catalyst having a phosphinimine ligand and a cyclopentadienyl type ligand; one or more activators, and a support. The dual catalyst may be supported on for example silica, or on an agglomerate material comprising clay and silica.

A related aspect of the invention is a continuous process to copolymerize ethylene and a co-monomer with a dual catalyst to provide a polymer composition comprising a first polymer component and a second polymer component wherein the continuous process comprises: controlling the ratio of the first polymer component to the second polymer component by conducting the process in the presence of between 0 or 0.001 molar ppm and 500 molar ppm of carbon dioxide; wherein lowering the level of carbon dioxide in molar ppm from a first higher level to a second lower level, decreases the ratio of the first polymer component to the second polymer component, and increasing the level of carbon dioxide in molar ppm from a first lower level to a second higher level, increases the ratio of the first polymer component to the second polymer component; provided that the dual catalyst comprises: a chromium catalyst, a group 4 single site catalyst, one or more catalyst activators, and a support; and wherein, the chromium catalyst provides the first polymer component and the group 4 single site catalyst provides the second polymer component; and wherein the first polymer component has a lower comonomer content and a lower weight average molecular weight, than the second polymer component.

The current invention provides a process to polymerize ethylene and optionally a co-monomer with a combination catalyst comprising a chromium catalyst, a group 4 single site catalyst having at least one phosphinimide ligand; and one or more catalyst activators, wherein the process provides a polymer composition comprising a first polymer component made by the chromium catalyst and a second polymer component made by the group 4 single site catalyst having at least one phosphinimide ligand; and wherein an activity modifier is contacted with the combination catalyst in an amount sufficient to change the ratio of the first polymer component to the second polymer component by preferentially reducing the activity of the group 4 single site catalyst having at least one phosphinimide ligand relative to the chromium catalyst.

In an embodiment of the invention, the combination catalyst comprises a chromium catalyst, a group 4 single site catalyst, one or more catalyst activators, and one or more catalyst supports.

In an embodiment of the invention, the combination catalyst comprises a chromium catalyst, a group 4 single site catalyst having at least one phosphinimide ligand, one or more catalyst activators, and one or more catalyst supports.

The use of carbon dioxide as described in the present invention can be used to maintain a consistent polymer product when made by a combination catalyst comprising a chromium catalyst and a single site catalyst. If a deviation in the polymer product is detected, then the level of carbon dioxide can be increased or decreased accordingly to bring the resin back to the desired specifications. More particularly, the feed of carbon dioxide to a reactor zone may be adjusted to restore a desired ratio of first and second polymer components (for example, the ratio of high and low molecular weight components and/or components having relatively lower or relatively higher comonomer contents).

BRIEF DESCRIPTION OF THE DRAWINGS

FIG. 1 is a Gel Permeation Chromatograph for polymerization runs using a supported chromium catalyst (solid line)

in the absence of carbon dioxide and a combination catalyst in the absence (dashed line) and presence of 20 volume ppm (ppmv) of carbon dioxide (dotted line) according to embodiments of the current invention.

DETAILED DESCRIPTION OF PREFERRED EMBODIMENTS

In the present invention, carbon dioxide levels are used to alter a polymer composition produced by a combination catalyst comprising a chromium catalyst, a group 4 single site catalyst and one or more activators.

More generally, in the present invention, an activity modifier is used to alter a polymer composition produced by a combination catalyst comprising at least a chromium catalyst, a group 4 single site catalyst and one or more activators. An "activity modifier" can be any compound which directly decreases the activity of at least one catalyst in a combination catalyst comprising at least a chromium catalyst, a group 4 single site catalyst and one or more activators. Preferably, the activity modifier negatively affects the activity (i.e. the catalyst activity is decreased) of a group 4 single site catalyst relative to a chromium catalyst. A preferred activity modifier is carbon dioxide.

In the current invention, the term "catalyst" denotes a compound which is active for ethylene homopolymerization or copolymerization of ethylene with alpha-olefins. The term "catalyst" also includes pre-catalysts. Pre-catalysts are compounds or complexes which require activation by suitable activators and/or cocatalysts in order to become active for ethylene homopolymerization or copolymerization of ethylene with alpha-olefins.

In the present invention, the term "combination catalyst" connotes a catalyst system which contains at least two different catalysts. In the present invention, the different catalysts can be independently un-supported or supported, but are preferably supported on one or more supports. Supported combination catalysts include dual catalysts and mixed catalysts. A combination catalyst preferably includes one or more catalyst activators and/or cocatalysts.

In the current invention, the term "dual catalyst" refers to a combination catalyst in which a minimum of two different catalysts are supported on the same batch of support particles. Hence for a dual catalyst, each polymerization catalyst will be co-immobilized on a support particle of a particular composition.

In the current invention, the term "mixed catalyst" refers to a combination catalyst in which at least two different polymerization catalysts have been independently supported on different batches of support particles. Hence, for a mixed catalyst, each of at least two polymerization catalysts will be independently immobilized on a different support particle which may be of the same or different composition.

In the present invention the term "group 4" means group 4 transition metal. Group 4 transition metals include Ti, Zr and Hf.

The combination catalyst used in the current invention comprises a chromium catalyst, a single site catalyst, and one or more activators. Any combination of chromium and single site catalysts is contemplated by the current invention, provided that the activity of the single site catalyst is more sensitive to the presence of carbon dioxide (i.e. is more negatively impacted), than the activity of the chromium catalyst. Without wishing to be bound by theory, carbon dioxide acts by preferentially shutting down active sites associated with the single site catalyst, through one or more chemical reactions, while having a negligible effect or a more modest effect on the active sites associated with the chromium catalyst.

The chromium catalyst of the current invention is any chromium compound or mixture of compounds capable of polymerizing olefins and which is relatively insensitive to the presence of carbon dioxide (i.e. the chromium catalyst used in a combination catalyst shows a relatively small or negligible drop in activity when in the presence of carbon dioxide and when compared to the single site catalyst used in the combination catalyst). The chromium catalyst is preferably supported. Minor amounts of a secondary metal species such as titanium and or aluminum compounds may also be incorporated, together with the chromium compound. The chromium compound used can be any appropriate chromium salt or an inorganic or organic chromium compound. For example, chromocene (i.e. bis(cyclopentadienyl)chromium), silyl chromate and chromium oxide may be used. Preferred chromium catalysts include chromium oxide and silyl chromate catalysts.

The chromium oxide may be $CrO_3$ or any compound that is convertible to $CrO_3$ under oxidizing conditions. Examples of compounds which are convertible to $CrO_3$ under oxidizing conditions are disclosed in U.S. Pat. Nos. 2,825,721; 3,023,203; 3,622,521; and 4,011,382 and include but are not limited to chromic acetyl acetone, chromic chloride, chromic nitrate, chromic acetate, chromic sulfate, ammonium chromate, ammonium dichromate and other soluble salts of chromate.

The silyl chromate (i.e. silyl chromium) catalysts will have at least one group of the formula I:

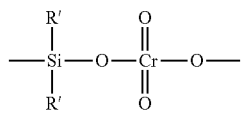

wherein R' is a hydrocarbyl group having from 1 to 14 carbon atoms.

In a preferred aspect of the invention, the silyl chromate catalyst is a bis-trihydrocarbylsilylchromate having the formula II:

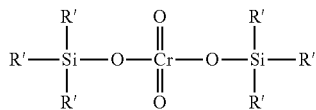

wherein R' is a hydrocarbyl group having from 1 to 14 carbon atoms. R' can independently be any type of hydrocarbyl group such as an alkyl, alkylaryl, arylalkyl or an aryl radical. Some non-limiting examples include methyl, ethyl, propyl, isopropyl, n-butyl, iso-butyl, n-pentyl, iso-pentyl, t-pentyl, hexyl, 2-methyl-pentyl, heptyl, octyl, 2-ethylhexyl, nonyl, decyl, hendecyl, dodecyl, tridecyl, tetradecyl, benzyl, phenethyl, p-methyl-benzyl, phenyl, tolyl, xylyl, naphthyl, ethylphenyl, methylnaphthyl, dimethylnaphthyl, and the like. Illustrative of the preferred silylchromates but by no means exhaustive or complete of those that can be employed in this process are such compounds as bis-trimethylsilylchromate, bis-triethylsilylchromate, bis-tributylsilylchromate, bis-triisopentylsilylchromate, bis-tri-2-ethylhexylsilylchromate,
bis-tridecylsilylchromate, bis-tri(tetradecyl)silylchromate, bis-tribenzylsilylchromate, bis-triphenethylsilylchromate, bis-triphenylsilylchromate, bis-tritolylsilylchromate, bis-trixylylsilylchromate, bis-trinaphthylsilylchromate, bis-triethylphenylsilylchromate, bis-trimethylnaphthylsilylchromate, polydiphenylsilylchromate, polydiethylsilylchromate and the like. Examples of bis-trihydrocarbylsilylchromate catalysts are also disclosed in U.S. Pat. Nos. 3,704,287 and 4,100,105.

In an embodiment of the invention, sufficient amounts of chromium catalyst are added to a support in order to obtain between 0.01% and 10% by weight of chromium, calculated as metallic chromium, based on the weight of the support. In another embodiment of the invention, sufficient amounts of chromium catalyst are added to a support in order to obtain between 0.05% to 3%, by weight of chromium, calculated as metallic chromium, based on the weight of the support.

The present invention is not limited to any particular procedure for supporting the chromium catalyst. Processes for depositing chromium catalysts on supports are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright ©2001 by John Wiley & Sons, Inc.; for some non-limiting methods for supporting chromium catalysts see U.S. Pat. Nos. 6,982,304; 6,013,595; 6,734,131; 6,958,375; and E.P. No. 640,625. For example, the chromium catalyst may be added by co-precipitation with the support material or by spray-drying with the support material. The chromium catalyst may also be added by a wet incipient method (i.e. wet impregnation) or similar methods using hydrocarbon solvents or other suitable diluents. Alternatively, the supported chromium catalyst may be obtained by mechanically mixing a solid chromium compound with a support material, followed by heating the mixture. In another variation, the chromium compound may be incorporated into the support during the manufacture thereof so as to obtain a homogeneous dispersion of the metal in the support. For example, a chromium compound may be spray dried with the constituent parts of a clay-inorganic oxide agglomerate to provide a supported chromium catalyst, as taught in U.S. Pat. No. 6,734,131.

The supported chromium catalyst may require activation prior to use. Activation may involve calcination (as is preferred in the case of chromium oxide) or the addition of co-catalyst compounds (as is preferred in the case of silyl chromate). For example, activation may be accomplished by calcination in steam, dry air or another oxygen containing gas at temperatures up to the sintering temperature of the support. Activation temperatures are in the range of 350° C. to 950° C., preferably from 500° C. to 900° C. and activation times are from about 10 mins. to about 72 hrs. The supported chromium catalyst may optionally be reduced after activation using for example, carbon monoxide or a mixture of carbon monoxide and nitrogen.

The supported chromium catalysts may optionally comprise one or more than one co-catalyst and mixtures thereof. In the present invention, the term "chromium catalyst" includes polymerization active chromium compounds per se as well as well as catalysts comprising a polymerization active combination of one or more chromium compounds and one or more co-catalysts. The co-catalyst can be added to the support using any well known method. The co-catalyst and chromium catalyst can be added to the support in any order or simultaneously. Alternatively, the co-catalyst can be added to the supported chromium catalyst in situ. By way of a non-limiting example, the co-catalyst is added as a solution or slurry in hydrocarbon solvent to the supported chromium catalyst which is optionally also in hydrocarbon solvent.

Co-catalysts include compounds represented by formula:

$$M^*R^2_n$$

where M* represents an element of the Group 1, 2 or 13 of the Periodic Table, a tin atom or a zinc atom; and each $R^2$ independently represents a hydrogen atom, a halogen atom (e.g., chlorine, fluorine, bromine, iodine and mixtures thereof), an alkyl group (e.g., methyl, ethyl, propyl, pentyl, hexyl, heptyl, octyl, decyl, isopropyl, isobutyl, s-butyl, t-butyl), an alkoxy group (e.g., methoxy, ethoxy, propoxy, butoxy, isopropoxy), an aryl group (e.g., phenyl, biphenyl, naphthyl), an aryloxy group (e.g., phenoxy), an arylalkyl group (e.g., benzyl, phenylethyl), an arylalkoxy group (benzyloxy), an alkylaryl group (e.g., tolyl, xylyl, cumenyl, mesityl), or an alkylaryloxy group (e.g., methylphenoxy), provided that at least one $R^2$ is selected from a hydrogen atom, an alkyl group having 1 to 24 carbon atoms or an aryl, arylalkyl or alkylaryl group having 6 to 24 carbon atoms; and n is the oxidation number of M*.

Preferred co-catalysts are organoaluminum compounds having the formula:

$$Al^2(X^1)_n(X^2)_{3-n},$$

where $(X^1)$ is a hydrocarbyl having from 1 to about 20 carbon atoms; $(X^2)$ is selected from alkoxide or aryloxide, any one of which having from 1 to about 20 carbon atoms; halide; or hydride; and n is a number from 1 to 3, inclusive. Specific examples of $(X^1)$ moieties include, but are not limited to, ethyl, propyl, n-butyl, sec-butyl, isobutyl, hexyl, and the like. In another aspect, $(X^2)$ may be independently selected from fluoro or chloro. The value of n is not restricted to be an integer, therefore this formula includes sesquihalide compounds or other organoaluminum cluster compounds.

Some non-limiting examples of aluminum co-catalyst compounds that can be used in this invention include, but are not limited to, trialkylaluminum compounds, dialkylaluminium halide compounds, dialkylaluminum alkoxide compounds, dialkylaluminum hydride compounds, and combinations thereof. Specific examples of organoaluminum co-catalyst compounds that are useful in this invention include, but are not limited to: trimethylaluminum (TMA); triethylaluminum (TEA); triisopropylaluminum; diethylaluminum ethoxide; tributylaluminum; disobutylaluminum hydride; triisobutylaluminum; and diethylaluminum chloride.

The molar ratio of co-catalyst to chromium catalyst can be about from about 1:1 to about 30:1. Alternatively, the molar ratio of co-catalyst to chromium catalyst can be about from about 1:1 to about 20:1. In another embodiment the molar ratio of co-catalyst to chromium catalyst can be about from about 5:1 to about 20:1.

Preferred single site catalysts for use in the process of the current invention are group 4 single site catalysts (i.e. single site catalysts comprising a group 4 transition metal as the active center). Single site catalysts include metallocene catalysts, so called "constrained geometry catalysts" and catalysts comprising at least one phosphinimide ligand (also known as a "phosphinimine" ligand) or at least one ketimide ligand (also known as a "ketimine" ligand). The single site catalyst should be chosen so as to have different sensitivity to carbon dioxide (in terms of activity) than the chromium catalyst chosen. In a preferred embodiment of the invention, the activity of the single site catalyst will be more negatively impacted than the activity of the chromium catalyst chosen in the presence of carbon dioxide.

In a preferred aspect of the invention the group 4 single site catalyst will have at least one phosphinimide ligand or at least one ketimide ligand. Especially preferred are group 4 single site catalysts having at least one phosphinimide ligand.

A single site catalyst having at least one phosphinimide ligand or ketimide ligand can be represented by the following formula:

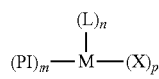

wherein M is a group 4 metal; PI is independently a phosphinimide ligand or a ketimide ligand; L is a monoanionic ligand selected from the group consisting of a cyclopentadienyl type ligand or a heteroatom ligand; X is an activatable ligand; m is 1 or 2; n is 0 or 1; and p is an integer and the sum of m+n+p equals the valence state of M. The preferred metals, M are selected from the group 4 transition metals with titanium being most preferred.

A phosphinimide ligand is defined by the formula $R_3P=N-$, where N is bonded to the transition metal, each R is independently selected from the group consisting of a hydrogen atom; a halogen atom; a $C_{1-20}$ hydrocarbyl radical which are un-substituted or further substituted by a halogen atom, a $C_{1-8}$ alkoxy radical, a $C_{6-10}$ aryl or aryloxy radical; an amido radical which is unsubstituted or substituted; a silyl radical which is unsubstituted or substituted by alkyl, alkoxy, aryl radicals or aryloxy radicals, and a germanyl radical which is unsubstituted or substituted by alkyl, alkoxy, aryl radicals or aryloxy radicals.

In an aspect of the invention, the phosphinimide ligand is substituted with three hydrocarbyl radicals which can be the same or different. In another aspect of the invention, the phosphinimide ligand is substituted with three tert-butyl radicals.

As used herein, the term "ketimide ligand" refers to a ligand which: (a) is bonded to the transition metal via a metal-nitrogen atom bond; (b) has a single substituent on the nitrogen atom, (where this single substituent is a carbon atom which is doubly bonded to the N atom); and (c) has two substituents Sub 1 and Sub 2 (described below) which are bonded to the carbon atom. Conditions a, b and c are illustrated below:

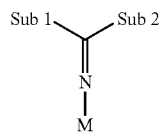

The substituents "Sub 1" and "Sub 2" may be the same or different and can be bonded to each other by a bridging group to form a ring. The bridging group can be any saturated or unsaturated alkyl group or aryl group including fused ring aryl groups, where the alkyl or aryl groups can optionally contain heteroatoms or be further substituted by alkyl, aryl or heteroatom containing alkyl or aryl groups. Exemplary substituents include hydrocarbyls having from 1 to 20 carbon atoms, silyl groups, amido groups and phosphido groups. For reasons of cost and convenience, these substituents may both be hydrocarbyl radicals, especially simple alkyl radicals (e.g. $C_{1-6}$) such as but not limited to tertiary butyl radicals.

The cyclopentadienyl type ligand (i.e. Cp) is a ligand comprising a 5-membered carbon ring having delocalized bonding within the ring and bound to the metal atom through $\eta^5$ bonds. The 5-membered ring can be un-substituted, partially substituted, or fully substituted with one or more substituents selected from the group consisting of: halogens; $C_{1-10}$ hydrocarbyl radicals in which the hydrocarbyl substituents are un-substituted or further substituted with a halogen atom and/or $C_{1-8}$ alkyl radical; a $C_{1-8}$ alkyl radical; a $C_{1-8}$ alkoxy radical; a $C_{6-10}$ aryl or aryloxy radical in which the aryl or aryloxy are un-substituted or further substituted by a halogen atom and/or a $C_{1-8}$ alkyl radical; an amido radical which is unsubstituted or substituted by alkyl or aryl radicals; a phosphido radical which is unsubstituted or substituted by alkyl or aryl radicals; a silyl radical which unsubstituted or substituted by alkyl, alkoxy, aryl radicals or aryloxy radicals; and a germanyl radical which is unsubstituted or substituted by alkyl, alkoxy, aryl radicals or aryloxy radicals. The cyclopentadienyl type ligand also includes, substituted or unsubstituted indenyl, fluorenyl or other fused ring systems which contain a 5-membered carbon ring having delocalized bonding within the ring and bound to the metal atom through $\eta^5$ bonds. In particular embodiments of the invention, the cyclopentadienyl ligand Cp is chosen from a cyclopentandienyl ligand having at least a perfluoroaryl substituent or at least a partially fluorinated aryl substituent. In other particular embodiments of the invention, the cyclopentadienyl ligand Cp is substituted by a perfluoroaryl substituent such as for example a pentafluorophenyl group and a $C_{1-10}$ alkyl substituent in a 1,2 or a 1,3 substitution pattern.

As used herein, the term heteroatom ligand refers to a ligand that contains at least one heteroatom selected from the group consisting of boron, nitrogen, oxygen, phosphorus or sulfur. The heteroligand may be sigma or pi-bonded to the metal. Exemplary heteroligands include silicon-containing heteroligands, amido ligands, alkoxy ligands, boron heterocyclic ligands (e.g. borabenzene ligands) and phosphole ligands, as further described below.

Silicon containing heteroligands are defined by the formula:

wherein the — denotes a bond to the transition metal and μ is sulfur or oxygen.

The substituents on the Si atom, namely $R^x$, $R^y$ and $R^z$ are required in order to satisfy the bonding orbital of the Si atom. The use of any particular substituent $R^x$, $R^y$ or $R^z$ is not specifically defined, but it is preferred that each of $R^x$, $R^y$ and $R^z$ is a $C_{1-2}$ hydrocarbyl group (i.e. methyl or ethyl) simply because such materials are readily synthesized from commercially available materials.

The term "amido" is meant to convey its broad, conventional meaning. Thus, these ligands are characterized by (a) a metal-nitrogen bond; and (b) the presence of two substituents, which are typically alkyl, phenyl, trialkyl or triaryl silyl groups on the nitrogen atom.

The terms "alkoxy" and "aryloxy" are also intended to convey their conventional meaning. Thus, these ligands are characterized by (a) a metal oxygen bond; and (b) the presence of a hydrocarbyl group bonded to the oxygen atom. The hydrocarbyl group may be a $C_{1-10}$ straight chained, branched or cyclic alkyl radical or a $C_{6-13}$ aromatic radical which radicals are un-substituted or further substituted by one or more $C_{1-4}$ alkyl radicals (e.g. 2,6 di-tertiary butyl phenoxy).

Boron heterocyclic ligands are characterized by the presence of a boron atom in a closed ring ligand (e.g. borabenzene ligands which are un-substituted or may be substituted by one or more halogen atoms, $C_{1-10}$ alkyl groups, and/or $C_{1-10}$ alkyl groups containing a hetero atom (e.g. O, or N atoms)). This definition includes heterocyclic ligands that may also contain a nitrogen atom in the ring. These ligands are well known to those skilled in the art of olefin polymerization and are fully described in the literature (see, for example, U.S. Pat. Nos. 5,637,659; 5,554,775; and references cited therein).

The term "phosphole" is also meant to convey its conventional meaning. "Phospholes" are cyclic dienyl structures having four carbon atoms and one phosphorus atom in the closed ring. The simplest phosphole is $C_4PH_4$ (which is analogous to cyclopentadiene with one carbon in the ring being replaced by phosphorus). The phosphole ligands may be substituted with, for example, $C_{1-20}$ hydrocarbyl radicals (which may, optionally, contain halogen substituents); phosphido radicals; amido radicals; or silyl or alkoxy radicals. Phosphole ligands are also well known to those skilled in the art of olefin polymerization and are described as such in U.S. Pat. No. 5,434,116.

In the current invention, the term "activatable", means that the ligand X, may be cleaved from the metal center M, via a protonolysis reaction or abstracted from the metal center M, by suitable acidic or electrophilic activator compounds respectively, which are further described below. The activatable ligand X may also be transformed into another ligand which is cleaved or abstracted from the metal center M. Protonolysis or abstraction reactions generate an active "cationic" metal center which can polymerize olefins, as is well known in the art. In an aspect of the present invention, the activatable ligand, X is independently selected from the group consisting of a hydrogen atom; a halogen atom, a $C_{1-10}$ hydrocarbyl radical, including a benzyl radical; a $C_{1-10}$ alkoxy radical; a $C_{6-10}$ aryl oxide radical, where each of the hydrocarbyl, alkoxy, and aryl oxide radicals may be un-substituted or further substituted by; an amido radical or a phosphido radical. Two X ligands may also be joined to one another and form for example, a substituted or unsubstituted diene ligand (i.e. 1,3-diene); or a delocalized heteroatom containing group such as an acetate or acetamidinate group. In a most convenient aspect of the invention, each X is independently selected from the group consisting of a halide atom and a $C_{1-4}$ alkyl radical.

In an aspect of the invention, the group 4 single site catalyst will have the formula $(Cp)_a(PI)_bM(X)_c$, where Cp is a cyclopentadienyl type ligand defined as above, PI is a phosphinimide or a ketimide ligand, M is a group 4 transitional metal, preferably Ti, Zr or Hf, and each X independently, is an activatable ligand and "a" is 0 or 1; "b" is 1 or 2; a+b=2; "c" is 1 or 2, and a+b+c=valance of the metal M.

In an embodiment of the invention, the single site catalyst is represented by the formula $Cp(PI)MX_2$ where, Cp is a cyclopentadienyl type ligand defined as above, PI is a phosphinimide ligand, M is Ti, Zr or Hf, and X is an activatable ligand.

The metallocene catalysts contemplated for use with the current invention may have from one to three cyclopentadienyl type ligands defined as above, provided that the remaining ligands are activatable ligands. For some non-limiting examples of metallocene catalysts see for example U.S. Pat. Nos. 4,808,561; 4,701,432; 4,937,301; 5,324,800; 5,633,394; 4,935,397; 6,002,033; and 6,489,413 which are incorporated herein by reference.

In an aspect of the invention, metallocene catalysts are represented by the formula:

$$Cp^\wedge_n MX_{4-n}$$

where M is a group 3 or 4 transition metal; each X is independently an activatable ligand defined as above, each Cp^ group is independently a cyclopentadienyl type ligand further described below and n is from 1 to 3. Preferably M is a group 4 transition metal with a valency of 4.

The cyclopentadienyl type ligand Cp^ is a ligand comprising a 5-membered carbon ring having delocalized bonding within the ring and bound to the metal atom through $\eta^5$ bonds. The 5-membered ring can be un-substituted, partially substituted, or fully substituted with one or more substituents.

The cyclopentadienyl type ligands Cp^ in metallocene catalysts also include heterocyclic analogues of a 5-membered carbon ring. For example, the Cp^ ring may typically comprise atoms selected from the group consisting of Groups 13 to 16 atoms, and more particularly, the atoms that make up the Cp^ ligands are selected from the group consisting of carbon, nitrogen, oxygen, silicon, sulfur, phosphorous, germanium, boron and aluminum and combinations thereof, wherein carbon makes up at least 50% of the ring members.

If more than one Cp^ ligand is present in a metallocene, then the ligands represented by Cp^ may be the same or different cyclopentadienyl ligands, either or both of which may contain heteroatoms and either or both of which may be substituted or unsubstituted. In one embodiment, Cp^ is independently selected from the group consisting of cyclopentadienyl, indenyl, tetrahydroindenyl, fluorenyl, and substituted derivatives of each.

Non-limiting examples of substituents which may be present on Cp^ include hydrogen radicals, halogens, alkyls, alkenyls, alkynyls, cycloalkyls, aryls, acyls, aroyls, alkoxys, aryloxys, alkylthiols, dialkylamines, alkylamidos, alkoxycarbonyls, aryloxycarbonyls, carbomoyls, alkyl- and dialkyl-carbamoyls, acyloxys, acylaminos, aroylaminos, and combinations thereof. More particular non-limiting examples of alkyl substituents include methyl, ethyl, propyl, butyl, pentyl, hexyl, cyclopentyl, cyclohexyl, benzyl, phenyl, methylphenyl, and tert-butylphenyl groups and the like, including all their isomers, for example tertiary-butyl, isopropyl, and the like. Other possible radicals include substituted alkyls and aryls such as, for example, fluoromethyl, fluroethyl, difluoroethyl, iodopropyl, bromohexyl, chlorobenzyl and hydrocarbyl substituted organometalloid radicals including trimethylsilyl, trimethylgermyl, methyldiethylsilyl and the like; and halocarbyl-substituted organometalloid radicals including tris(trifluoromethyl)silyl, methylbis(difluoromethyl)silyl, bromomethyldimethylgermyl and the like; and disubstituted boron radicals including dimethylboron for example; and disubstituted Group 15 radicals including dimethylamine, dimethylphosphine, diphenylamine, methylphenylphosphine, Group 16 radicals including methoxy, ethoxy, propoxy, phenoxy, methylsulfide and ethylsulfide. Other substituents for Cp^ include olefins such as but not limited to olefinically unsaturated substituents including vinyl-terminated ligands, for example 3-butenyl, 2-propenyl, 5-hexenyl and the like. In one embodiment, at least two substituents on a Cp^, for example two adjacent substituents are joined to form a ring structure having from 3 to 30 atoms selected from the group consisting of carbon, nitrogen, oxygen, phosphorous, silicon, germanium, aluminum, boron and combinations thereof. Also, a substituent such as 1-butanyl may form a bonding association to the element M.

Two Cp^ ligands may be bridged to each other by at least one bridging group, (A). In these "bridged metallocenes" (A) is chemically bonded to each Cp^. Non-limiting examples of bridging group (A) include divalent hydrocarbon groups containing at least one Group 13 to 16 atom, such as but not limited to at least one of a carbon, oxygen, nitrogen, silicon, aluminum, boron, germanium and tin atom and combinations thereof; wherein the heteroatom may also be $C_1$ to $C_{12}$ alkyl or aryl substituted to satisfy neutral valency. The bridging group (A) may also contain further substitution, such as alkyl, aryl, alkoxy, halide etc. Further non-limiting examples of bridging group (A) are represented by $C_1$ to $C_6$ alkylenes, substituted $C_1$ to $C_6$ alkylenes, oxygen, sulfur, $R'''_2C=$, $R'''_2Si=$, $—Si(R''')_2Si(R''')_2—$, $R'''_2Ge=$, $R'''P=$ (wherein "=" represents two chemical bonds), where R''' is independently selected from the group consisting of hydride, hydrocarbyl, substituted hydrocarbyl, halocarbyl, substituted halocarbyl, hydrocarbyl-substituted organometalloid, halocarbyl-substituted organometalloid, disubstituted boron, disubstituted Group 15 atoms, substituted Group 16 atoms, and halogen radical; and wherein two or more R''' may be joined to form a ring or ring system. In one embodiment, the bridged metallocene catalyst has two bridging groups (A) joining two Cp^ ligands.

The constrained geometry catalyst contemplated for use with the current invention has a cyclopentadienyl type ligand, Cp* forming a bringing moiety with a heteroatom ligand. Such compounds are well known in the art and are described in for example, U.S. Pat. Nos. 5,057,475; 5,096,867; 5,064,802; 5,132,380; 5,703,187; and 6,034,021 all of which are incorporated by reference herein in their entirety. Constrained geometry catalysts are conveniently represented by the formula:

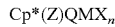

Cp*(Z)QMX$_n$ where M is a group 3 or 4 transition metal, each X is independently an activatable ligand defined as above; Cp* is a cyclopentadienyl type ligand comprising a 5-membered carbon ring having delocalized bonding within the ring and bound to the metal atom through $\eta^5$ bonds and has at least one attachment point to Z; n is 1 or 2 depending on the valence of the metal; Q is a heteroatom-containing ligand bonded to the metal, and Z is a bridging group bonded to Cp* and Q. Preferably, M is a group 4 transition metal.

The 5-membered ring Cp* which is bonded to Z at one position can further be un-substituted, partially substituted, or fully substituted with one or more substituents selected from halogens; $C_{1-10}$ hydrocarbyl radicals in which the hydrocarbyl substituents are unsubstituted or further substituted with a halogen atom and/or $C_{1-8}$ alkyl radical; a $C_{1-8}$ alkyl radical; a $C_{1-8}$ alkoxy radical; a $C_{6-10}$ aryl or aryloxy radical in which the aryl or aryloxy are un-substituted or further substituted by a halogen atom and/or $C_{1-8}$ alkyl radical; an amido radical which is unsubstituted or substituted by alkyl or aryl radicals; a phosphido radical which is unsubstituted or substituted by alkyl or aryl radicals; a silyl radical which unsubstituted or substituted by alkyl, alkoxy, aryl radicals or aryloxy radicals; and a germanyl radical which is unsubstituted or substituted by alkyl, alkoxy, aryl radicals or aryloxy radicals. The cyclopentadienyl type ligand Cp* also includes, substituted or unsubstituted indenyl, fluorenyl or other fused ring systems which contain a 5-membered carbon ring having delocalized bonding within the ring and bound to the metal atom through $\eta^5$ bonds.

The bridging group Z is a moiety comprising boron, or a member of group 14 of the periodic table of the elements, and optionally sulfur or oxygen, the moiety having up to 40 non-hydrogen atoms, and optionally Cp* and Z together form a fused ring system The group Q is an anionic or neutral ligand group bonded to Z and M, comprising nitrogen, phosphorus, oxygen or sulfur and having up to 40 non-hydrogen atoms, and optionally Q and Z together form a fused ring system.

In an aspect of the invention, Q is $—O—$, $—S—$, $NR*—$, $—PR*—$, or a neutral two electron donor ligand selected from the group consisting of OR*, SR*, NR*$_2$, PR*$_2$ where R* each occurrence is independently selected from the group consisting of hydrogen, alkyl, aryl, silyl, halogenated alkyl, halogenated aryl groups having up to 20 non-hydrogen atoms, and mixtures thereof, or two or more R* groups from Z, Q or both Z and Q form a fused ring system.

In an aspect, Z is SiR*$_2$, CR*$_2$, SiR*$_2$SiR*$_2$, CR*$_2$CR*$_2$, CR*=CR*, CR*$_2$SiR*$_2$, GeR*$_2$, BR*, BR*$_2$; where: R* each occurrence is independently selected from the group consisting of hydrogen, alkyl, aryl, silyl, halogenated alkyl, halogenated aryl groups having up to 20 non-hydrogen atoms, and mixtures thereof, or two or more R* groups from Z, Q or both Z and Q form a fused ring system.

In an aspect of the invention, Q is a substituted or unsubstituted amido or phosphido group, preferably a substituted group with a $C_{1-10}$ alkyl, a $C_6$-$C_{10}$ aryl, or a silyl group substituent.

Further single site catalysts which may useful in the process of the current invention include catalysts comprising phenoxyimine and similar closely related ligands such as those described in U.S. Pat. Nos. 6,309,997; 6,399,724; 6,770,723 and 6,593,266; and catalysts comprising bidentate or tridentate ligands having a group 15 atom such as those described in U.S. Pat. Nos. 6,274,684; 6,689,847; 6,583,083; 6,300,438; 6,417,304; 6,300,439; 6,271,325; 6,320,002; 6,303,719; and 6,103,657, so long as the catalyst chosen has a differential sensitivity to carbon dioxide (in terms of activity) relative to the chromium catalyst.

The single site catalyst used in the current invention will typically require activation with one or more suitable activators. Suitable catalyst activators are selected from the group consisting of alkylaluminoxanes, ionic activators and electrophilic borane compounds, with alkylaluminoxanes and ionic activators being preferred.

The alkylaluminoxanes are complex aluminum compounds of the formula:

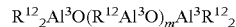

$R^{12}_2Al^3O(R^{12}Al^3O)_mAl^3R^{12}_2$ wherein each $R^{12}$ is independently selected from the group consisting of $C_{1-20}$ hydrocarbyl radicals and m is from 3 to 50. Optionally a hindered phenol can be added to the alkylaluminoxane to provide a molar ratio of $Al^3$:hindered phenol of from 2:1 to 5:1 when the hindered phenol is present.

In an aspect of the invention, $R^{12}$ of the alkylaluminoxane is a methyl radical and m is from 10 to 40. In an aspect of the invention, the molar ratio of $Al^3$:hindered phenol, if it is present, is from 3.25:1 to 4.50:1. Preferably the phenol is substituted in the 2, 4 and 6 position by a $C_{2-6}$ alkyl radical. Desirably the hindered phenol is 2,6-di-tertbutyl-4-ethylphenol.

The alkylaluminoxanes are typically used in substantial molar excess compared to the amount of group single site catalyst. The $Al^3$:single site catalyst transition metal molar ratios are from 10:1 to 10,000:1, preferably about 30:1 to 500:1.

The ionic activators include activators that activate the organometallic complex by protonolysis of a suitable activatable ligand or by the electrophilic abstraction of a suitable activatable ligand. Although the "ionic activator" may abstract or cleave one or more activatable ligand so as to ionize the catalyst center into a "cation", it does not covalently bond with the catalyst, providing instead, sufficient distance between the catalyst metal center and the ionizing activator to permit a polymerizable olefin to enter the resulting active site.

The ionic activators used in the present invention are selected from compounds of the formula:

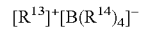

$[R^{13}]^+[B(R^{14})_4]^-$ wherein B is a boron atom, $R^{13}$ is a cyclic $C_{5-7}$ aromatic cation or a triphenyl methyl cation and each $R^{14}$ is independently selected from the group consisting of phenyl radicals which are un-substituted or substituted with 3 to 5 substituents selected from the group consisting of a fluorine atom, a $C_{1-4}$ alkyl or alkoxy radical which is un-substituted or substituted by a fluorine atom; and a silyl radical of the formula —Si—$(R^{15})_3$; wherein each $R^{15}$ is independently selected from the group consisting of a hydrogen atom and a $C_{1-4}$ alkyl radical; and compounds of the formula:

$$[(R^{18})_t Z^*H]^+ [B(R^{14})_4]^-$$

wherein B is a boron atom, H is a hydrogen atom, Z* is a nitrogen atom or phosphorus atom, t is 2 or 3 and $R^{18}$ is selected from the group consisting of $C_{1-8}$ alkyl radicals, a phenyl radical which is un-substituted or substituted by up to three $C_{1-4}$ alkyl radicals, or one $R^{18}$ taken together with the nitrogen atom may form an anilinium radical and $R^{14}$ is as defined above.

Specific ionic activators that may be used in the current invention include but are not limited to: triethylammonium tetra(phenyl)boron, tripropylammonium tetra(phenyl)boron, tri(n-butyl)ammonium tetra(phenyl)boron, trimethylammonium tetra(p-tolyl)boron, trimethylammonium tetra(o-tolyl) boron, tributylammonium tetra(pentafluorophenyl)boron, tripropylammonium tetra(o,p-dimethylphenyl)boron, tributylammonium tetra(m,m-dimethylphenyl)boron, tributylammonium tetra(p-trifluoromethylphenyl)boron, tributylammonium tetra(pentafluorophenyl)boron, tri(n-butyl) ammonium tetra(o-tolyl)boron, N,N-dimethylanilinium tetra (phenyl)boron, N,N-diethylanilinium tetra(phenyl)boron, N,N-diethylanilinium tetra(phenyl)n-butylboron, di(isopropyl)ammonium tetra(pentafluorophenyl)boron, dicyclohexylammonium tetra(phenyl)boron, triphenylphosphonium tetra (phenyl)boron, tri(methylphenyl)phosphonium tetra(phenyl) boron, tri(dimethylphenyl)phosphonium tetra(phenyl)boron, tropillium tetrakispentafluorophenyl borate, triphenylmethylium tetrakispentafluorophenyl borate, tropillium phenyl-trispentafluorophenyl borate, triphenylmethylium phenyl-trispentafluorophenyl borate, benzene (diazonium) phenyltrispentafluorophenyl borate, tropillium tetrakis (2,3, 5,6-tetrafluorophenyl) borate, triphenylmethylium tetrakis (2,3,5,6-tetrafluorophenyl) borate, tropillium tetrakis (3,4,5-trifluorophenyl) borate, benzene (diazonium) tetrakis (3,4,5-trifluorophenyl) borate, tropillium tetrakis (1,2,2-trifluoroethenyl) borate, triphenylmethylium tetrakis (1,2,2-trifluoroethenyl) borate, tropillium tetrakis (2,3,4,5-tetrafluorophenyl) borate, and triphenylmethylium tetrakis (2,3,4,5-tetrafluorophenyl) borate.

Some readily commercially available ionic activators include: N,N-dimethylaniliniumtetrakispentafluorophenyl borate; tri phenylmethylium tetrakispentafluorophenyl borate (tritylborate); and trispentafluorophenyl borane.

The ionic activators may also have an anion containing at least one group comprising an active hydrogen or at least one of any substituent able to react with the support. As a result of these reactive substituents, the anionic portion of these ionic activators may become bonded to the support under suitable conditions. One non-limiting example includes ionic activators with tris(pentafluorophenyl)(4-hydroxyphenyl) borate as the anion. These tethered ionic activators are more fully described in U.S. Pat. Nos. 5,834,393; 5,783,512; and 6,087, 293.

The electrophilic borane compounds that may be used in the present invention include compounds of the formula:

$$B(R^{14})_3$$

wherein $R^{14}$ is as defined above.

The ionic activators or electrophilic borane compounds may be used in amounts which provide a molar ratio of group 4 transition metal to boron that will be from 1:1 to 1:6, preferably from 1:1 to 1:2.

Optionally, mixtures of alkylaluminoxanes, ionic activators, and electrophilic boranes may be used as activators in the second catalyst component of the current invention.

In a preferred aspect of the invention, the single site catalyst is supported.

The present invention is not limited to any particular procedure for supporting the single site catalyst. Processes for depositing a single site catalyst complex as well as an activator on a support are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright ©2001 by John Wiley & Sons, Inc.; for some non-limiting methods to support a single site catalyst see U.S. Pat. No. 5,965,677). For example, the single site catalyst may be added by co-precipitation with the support material. The activator can be added to the support before and/or after the single site catalyst or together with the single site catalyst. Optionally, the activator can be added to a supported single site catalyst in situ or the single site catalyst may be added to the support in situ or the single site catalyst can be added to a supported activator in situ. The single site catalyst may be slurried or dissolved in a suitable diluent or solvent and then added to the support. Suitable solvents or diluents include but are not limited to hydrocarbons and mineral oil. The single site catalyst may be added to the solid support, in the form or a solid, solution or slurry, followed by the addition of the activator in solid form or as a solution or slurry. Single site catalyst, activator, and support can be mixed together in the presence or absence of a solvent. In an embodiment, a solution or slurry containing a single site catalyst and activator in a hydrocarbon is added to a support.

The amount of single site catalyst added to the support should be sufficient to obtain between 0.001 and 10% or between 0.01% and 10%, by weight of group 4 transition metal, calculated as metallic Ti, Zr, Hf or combined total thereof, based on the weight of the support. In another embodiment, the single site catalyst added to the support should be sufficient to obtain between 0.01% to 3%, by weight of group 4 transition metal, calculated as metallic Ti, Zr, Hf or combined total thereof, based on the weight of the support.

The chromium and single site catalysts may be supported on one or more of any known support material. Catalyst supports are well known in the art and may be chosen from a wide range of well known materials or mixtures thereof. For example, catalyst supports include inorganic oxides, such as but not limited to silica gel; magnesium halides; zeolites; layered clay minerals; agglomerated support materials; and polymer supports such as but not limited to polyethylene, polypropylene, polystyrene, or poly(aminostyrene) supports. In some cases, a support material may also act as a polymerization catalyst activator or as a co-catalyst. For example, supports that are Lewis acidic, contain aluminoxane functionalities, or where the support is capable of performing similar chemical functions as an aluminoxane, are suitable for use as a "support-activator".

Preferred supports for use in the current invention are inorganic oxides, and agglomerates of clays or clay minerals with inorganic oxides.

The inorganic oxide may be any oxide of the metals from groups 2, 3, 4, 11, 12, 13 and 14 of the Period Table of Elements. Preferred inorganic oxides include silica, $SiO_2$; aluminophosphate, $AlPO_4$; magnesia, MgO; alumina, $Al_2O_3$; titania, $TiO_2$; zinc oxide, ZnO; and zirconia, $ZrO_2$ and the like or mixtures thereof, with $SiO_2$ being most preferred. When the inorganic oxide is a silica support, it will contain not less than 80% by weight of pure $SiO_2$, the balance being other oxides such as but not limited to oxides of Zr, Zn, Mg, Ti, Mg and P.

The clay or clay mineral (i.e. "layered silicates") used in the current invention can be amorphous or crystalline and has a three dimensional structure which has its strongest chemical bonds in only two dimensions. In general, clay minerals may be composed of layered silicates of nanometer scale thickness. A silicate layer is comprised of silicate sheets fused by alumina or magnesia. Stacking of the silicate layers provides a clay gallery, which is represented by a regular interlayer spacing between the silicate layers. The gallery typically contains hydrated inorganic cations, the nature of which is determined by the source of the clay mineral. Calcium, $Ca^{2+}$, sodium, $Na^+$ and potassium, $K^+$ are common.

The clay mineral is not specifically defined, but preferably includes any natural or synthetic layered silicate having a negative charge below zero and which is capable of forming an agglomerate with a inorganic oxide such as silica.

Non-limiting examples of clay minerals which are useful in the current invention generally are smectites, vermiculites, and micas; including phyllosilicate, montmorillonite, hectorite, betonite, laponite, saponite, beidellite, stevensite, kaolinite, hallosite, and magadite. Of these, montmorillonite (MMT) is preferred.

The interlaminar cations found in clay can be ion exchanged with other cations. The cation exchange capacity (CEC) of a clay is a measure of the exchangeable cations present in the clay or the total quantity of positive charge that can be absorbed onto the clay. It may be measured in SI units as the positive charge (coulombs) absorbed by the clay per unit of mass of the clay. It is also conveniently measured in milliequivalents per gram of clay (meq/g) or per 100 gram of clay (meq/100 g). 96.5 coulombs per gram of cation exchange capacity is equal to 1 milliequivalent per gram of cation exchange capacity.

The term "agglomerate" in the current invention refers to a support in which particles of an inorganic oxide and a layered silicate or clay are held together by a variety of physical-chemical forces. An agglomerate is distinct from a simple "support blend" in which two types of support material have merely been stirred or mixed into one another. An "agglomerate" or "agglomerate support" is generally composed of inorganic oxide particles (i.e. primary particles) and clay or clay/inorganic oxide particles (i.e. smaller secondary particles), where inorganic oxide particles (i.e. primary particles) and clay particles or clay/inorganic oxide particles (i.e. secondary particles) are joined at some points of contact.

Agglomerate supports comprising a clay mineral and an inorganic oxide, may be prepared using a number techniques well known in the art including pelletizing, extrusion, drying or precipitation, spray-drying, shaping into beads in a rotating coating drum, and the like. A nodulization technique may also be used. Methods to make agglomerate supports comprising a clay mineral and an inorganic oxide include spray-drying a slurry of a clay mineral and an inorganic oxide. Methods to make agglomerate supports comprising a clay mineral and an inorganic oxide are disclosed in U.S. Pat. Nos. 6,686,306; 6,399,535; 6,734,131; 6,559,090 and 6,958,375.

For the combination catalyst, the molar ratio of chromium catalyst to single site catalyst is not specifically defined, but is typically in the range of 100:1 to 1:100. In further embodiments of the invention the molar ratio of chromium catalyst to single site catalyst can be from 50:1 to 1:50 or from 25:1 to 1:25 or 10:1 to 1:10 or from 5:1 to 1:5 or from 15:1 to 1:2 or from 15:1 to 1:1.

In an aspect of the invention the combined catalyst is a dual catalyst. The chromium catalyst and the single site catalyst as well as one or more activators and optional co-catalysts, may be co-immobilized on a support using any known method. Processes for depositing chromium catalysts, single site catalysts, as well as activators and co-catalysts on a support are well known in the art (for some non-limiting examples of catalyst supporting methods, see "Supported Catalysts" by James H. Clark and Duncan J. Macquarrie, published online Nov. 15, 2002 in the Kirk-Othmer Encyclopedia of Chemical Technology Copyright ©2001 by John Wiley & Sons, Inc.; for some non-limiting methods to support chromium catalysts see: U.S. Pat. Nos. 6,982,304; 6,013,595; 6,734,131; 6,958,375; and E.P. No. 640,625; for some non-limiting methods to support a single site catalyst see U.S. Pat. No. 5,965,677). For example, catalysts, co-catalysts and activators may be added by co-precipitation or spray drying with the support material or alternatively by a wet incipient method (i.e. wet impregnation) or similar method using hydrocarbon solvents/diluents or other suitable solvents/diluents.

The chromium catalyst and the single site catalyst as well as activators and optional co-catalysts can be added to the support material in any order. The dual catalyst system can be prepared in a stepwise manner in which catalyst precursors or intermediates are isolated or not isolated.

In an aspect of the invention, the chromium catalyst and the optional co-catalyst are added to a support prior to the addition of the single site catalyst and activator. The single site catalyst and activator can be added simultaneous or in pre-mixed form or they may be added separately and in any order. The single site catalyst and activator can also be added to the supported chromium catalyst in situ (i.e. in a polymerization reactor or on route to a reactor).

In the present invention, the chromium catalyst and the single site catalyst will preferably produce polymer components having different concentrations of comonomer. Comonomer concentration or "comonomer content" is typically reported as mol % or as weight %. Either mol % or weight % can be used in the present invention to represent comonomer content. The comonomer content in an ethylene/alpha-olefin copolymer can be obtained using FTIR methods or GPC-FTIR methods (for multicomponent polymers) as is well known to persons skilled in the art. For example, an FTIR measurement as per the ASTM D6645-01 can be used to obtain the short chain branch (SCB) frequency of an ethylene/alpha-olefin copolymer in branches per 1000 carbons, which can then be converted into a mol % or weight % number. Comonomer content can also be measured using $^{13}C$ NMR techniques as discussed in Randall, Rev. Macromol. Chem. Phys., C29 (2&3), p 285; U.S. Pat. No. 5,292,845 and WO 2005/121239.

In an embodiment of the present invention, the chromium catalyst will produce a polymer component which has a lower comonomer content than a polymer component produced by the single site catalyst under common polymerization conditions (e.g. hydrogen concentration, temperature, pressure, comonomer concentration etc.). Such polymer compositions can be made using a dual or multisite catalyst comprising a chromium catalyst and a group 4 single site catalyst having at least one phosphinimide or ketimide ligand as is described in co-pending CA Pat. Appl. Nos 2,605,044 and 2,605,077 which are incorporated herein by reference.

Depending on the relative weight average molecular weights ($M_w$) of the polymer components made by each of the chromium and the single site catalyst, a component may be designated a high molecular weight (HMW) component or a low molecular weight (LMW) component.

In an embodiment of the present invention, the chromium catalyst and the single site catalyst will produce polymer components with a different weight average molecular weight ($M_w$) under common polymerization conditions (i.e. under the same hydrogen concentration, temperature, pressure, comonomer concentration, etc., the first and second polymer components will have different weight average molecular weights). Polymer compositions in which the chromium catalyst and the single site catalyst produce polymer components with similar weight average molecular weights are also part of the current invention (i.e. the first and second polymer components have similar weight average molecular weights).

In an embodiment of the invention the chromium catalyst produces a relatively lower molecular weight (LMW) or relatively higher molecular weight (HMW) component of a polyethylene composition, while the single site catalyst produces the corresponding high molecular weight (HMW) or low molecular weight (LMW) component of a polyethylene composition.

In an embodiment of the invention the chromium catalyst produces the low molecular weight (LMW) component of a polyethylene composition, while the single site catalyst produces the high molecular weight of a polyethylene composition. To clarify, the first polymer component if made by the chromium catalyst will preferably have a lower weight average molecular weight, than the weight average molecular weight of the second polymer component if made by a single site catalyst.

The LMW component of the polymer made with the current invention may have a weight average molecular weight ($M_w$), as measured by Gel Permeation Chromatography (GPC), of from 10,000 to 500,000. In further aspects of the invention the LMW component may have a Mw of from 25,000 to 400,000, or from 25,000 to 350,000 or from 50,000 to 300,000, or from 100,000 to 250,000. The HMW component of the polymer made with the current invention may have a weight average molecular weight ($M_w$), as measured by Gel Permeation Chromatography (GPC), of from 50,000 to 750,000. In further aspects of the invention the HMW component may have a Mw of from 100,000 to 750,000 or from 125,000 to 500,000 or from 125,000 to 425,000 or from 150,000 to 400,000 or from 175,000 to 350,000.

In an aspect of the invention, the first polymer component, which is made with a chromium catalyst, will have both a lower weight average molecular weight and a lower comonomer content than the second polymer component made with a single site catalyst. Such a polymer composition can be made using a dual or multisite catalyst comprising a chromium catalyst and a single site catalyst as is described in co-pending CA Pat. Appl. Nos 2,605,044 and 2,605,077 which are incorporated herein by reference. It is well known in the art that comonomer content can be determined using $^{13}C$ NMR techniques, FTIR branching analysis, combined GPC-FTIR methods or by determination of the resin density. In an aspect of the process according to the current invention, the weight average molecular weight of the high molecular weight component ($M_w$-HMW) has an average molecular weight which is less than 200% higher than the weight average molecular weight of the low molecular weight component ($M_w$-LMW).

In further aspects of the invention the $M_w$-HMW may be less than 150% higher, or less than 100% higher, or less than 75% higher, or less than 50% higher than the $M_w$-LMW.

The overall polymer compositions may be broad and unimodal, bimodal or multimodal when examined by gel permeation chromatography (GPC). The polymer compositions made during use of the present invention may or may not have resolved high and low molecular weight peaks in a GPC chromatograph.

In an aspect of the invention, the combination catalyst and process of the current invention produces polymers having reversed or partially reversed comonomer distributions. The phrase "reversed comonomer distribution" or "partially reversed comonomer distribution" means that on deconvolution of GPC-FTIR (or temperature raising elution fractionation, TREF) data (profiles) (typically using molecular weight distribution segments of not less than 10,000) there is one or more higher molecular weight components having a higher comonomer incorporation than in one or more lower molecular weight segments. If the comonomer incorporation rises with molecular weight, the distribution is described as "reversed". Where the comonomer incorporation rises with increasing molecular weight and then declines, the comonomer distribution is described as "partially reversed".

In order to control the ratio of high to low molecular weights and hence the polymer composition made with the process of the current invention, the polymerization process is carried out in a reactor system in the presence of a combination catalyst and between 0 or 0.001 and 500 molar ppm of carbon dioxide. The term "molar ppm" refers the parts per million in moles of carbon dioxide present in a reactor zone, based on the total moles of gases present in a reactor zone. Alternatively, the term "volume ppm" refers the parts per million in the volume of carbon dioxide present in a reactor zone, based on the total volume of gases present in a reactor zone. Molar ppm and volume ppm are equivalent under assumed ideal gas conditions. In another aspect of the invention the process is carried out between 0 or 0.01 and 100 molar ppm of carbon dioxide.

The actual amount of carbon dioxide required to control the ratio of high to low molecular weight components will depend mainly on the sensitivity of the single site catalyst. If the single site catalyst has poor sensitivity to carbon dioxide then higher amounts of carbon dioxide may be required to reduce its polymerization activity and to obtain the desired ratio of high to low molecular weight components. Conversely, a single site catalyst which has high sensitivity to carbon dioxide may require lower amounts of carbon dioxide to reduce its polymerization activity and to obtain the desired ratio of high to low molecular weight components.

In an aspect of the invention, polymerization is carried out in the presence of between 0.001 and 500 molar ppm of carbon dioxide or more typically between 0.01 and 250 molar ppm. In further aspects of the invention, polymerization is carried out in the presence of between 0.01 and 150 molar ppm of carbon dioxide or between 0.01 and 100 molar ppm of carbon dioxide or between 0.1 and 50 molar ppm of carbon dioxide.

In the present invention, the ratio of the first polymer component to the second polymer component may be represented as weight percent (wt %) ratio, which is based on the weight of each component over the sum of the weights of the first and second polymer components or the entire weight of the polymer composition. The weight ratios for first and second polymer components may be estimated by deconvolution of a GPC curve obtained for the polymer composition. Methods of polymer deconvolution are well known to persons skilled in the art; see for example Computer Applications in Applied Polymer Science, ACS Symposium Series, 1982, v197, Broyer, E. and Abbott, R., p 45-64. Flory's most probable distribution is often the method of choice to represent the molecular weight distribution (MWD) of polymers or polymer components. Polymers or polymer components with broad MWD can be represented by the sum of multiple Flory distributions. Generally, a deconvolution procedure may require the optimization of the Flory distribution parameter using a least-square objective function minimization, where the least-square function is the difference between the sample molecular weight distribution obtained by GPC analysis and the sum of the Flory distributions. The deconvolution process can be further improved using experimental knowledge about the catalyst system, which can be used to further constrain the solution of the objective function minimization. Once a multicomponent polymer composition has been deconvoluted, the weight fraction of polymer produced by each catalyst in a combination catalyst may be estimated by integrating the molecular weight distributions representing those polymer components made by each catalyst in the combination catalyst.

In an aspect of the invention, the presence of carbon dioxide will change the weight percent of the first or second polymer components in the polymer composition by at least 0.5%. In further aspects of the invention, the presence of carbon dioxide will change the weight percent of the first and second polymer components in the polymer composition by at least 1%, or at least 5% or at least 10% or at least 20% or at least 25%.

The combination catalyst of the present invention will provide a polymer composition comprising a first polymer component produced by a chromium catalyst and a second polymer component produced by a single site catalyst (e.g. a group 4 single site catalyst).

In the polymer composition made by the process of the current invention the first polymer component represents from 99 to 1 weight percent of the polymer composition and the second polymer component represents from 1 to 99 weight percent of the polymer composition based on the total weight of polymer composition. In another aspect of the invention the first polymer component represents from 95 to 25 weight percent of the polymer composition and the second polymer component represents from 5 to 75 weight percent of the polymer composition. In another aspect on the invention the first polymer component represent from 90 to 50 weight percent of the polymer composition and the second polymer component represents from 10 to 50 weight percent of polymer composition. In yet another aspect of the invention the first polymer component represents from 90 to 65 weight percent of the polymer composition and the second polymer component represents from 10 to 35 weight percent of the polymer composition. In still another aspect of the invention the first polymer component represents from 95 to 75 weight percent of the polymer composition and the second polymer component represents from 5 to 25 weight percent of the polymer composition. In still another aspect of the invention the first polymer component represents from 95 to 80 weight percent of the polymer composition and the second polymer component represents from 5 to 20 weight percent of the polymer composition. In still another aspect of the invention the first polymer component represents from 95 to 85 weight percent of the polymer composition and the second polymer component represents from 5 to 15 weight percent of the polymer composition.

In an aspect of the invention the polymer composition will have a high load melt index, $I_{21}$ in the range of from 1 to 500 g/10 min. In further aspects of the invention the polymer composition will have an $I_{21}$ in the range of from 1 to 100 or from 1 to 20 or from 1 to 15 or from 1 to 10 or from 3 to 10 g/10 min.

In an aspect of the invention the polymer composition will have a low, medium or high density and generally fall in the range of from 0.890 to 0.960 g/cc. In a particular aspect of the invention, the polymer composition will have a high density in the range of from 0.940 to 0.960 g/cc, preferably from 0.947 to 0.955 g/cc, making it suitable for use in high density pipe applications.

In the present invention, the individual polymer components may themselves be broad, bimodal, or multimodal, and may or may not include peaks and shoulders and may or may not show peaks which are or are not fully resolved when the polymer composition is examined by gel permeation chromatography.

The process of the current invention can be a batch polymerization process or a continuous polymerization process both of which are well understood by persons skilled in the art.

Typically, a batch polymerization process will involve adding a combination catalyst, monomer and comonomer as well as any diluents or other reagents such as scavengers, once to a polymerization reactor. The polymerization reaction is typically initiated by injecting the combination catalyst into the reactor in the presence of polymerizable monomers. In a batch process, polymer is usually isolated after the reaction has been quenched with a suitable quenching agent. When using a batch process for the current invention, carbon dioxide may be added once, before or after the polymerization reaction starts. Carbon dioxide may also be flushed from the reactor using an inert gas or it may be added several times to obtain a desired concentration in the reactor.

Preferably, the process of the current invention is a continuous polymerization process. Typically, a continuous polymerization process will involve continuous feeding of catalyst, monomer, diluents, scavengers, and the like to continuously produce polymer. In an aspect of the present invention, carbon dioxide is continuously fed to a continuous polymerization reactor or reaction zone in addition to monomer, optional comonomers and a combination catalyst. In a continuous process the ratio of carbon dioxide to combination catalyst being fed to the reactor can be increased or decreased. Alternatively, the flow of combination catalyst to the reactor may be kept approximately constant while the ratio of carbon dioxide to ethylene flow is increased or decreased. Either way, the ratio of carbon dioxide to combination catalyst present in the reactor is changed. Polymer is removed from the reactor in a continuous or periodic manner. Continuous reactor processes are well known by persons skilled in the art and include, solution, slurry and gas phase processes.

In the current invention, the amount of carbon dioxide present can be pre-determined, or changed in situ.

For a continuous process in which the combination catalyst is continuously added to a reactor system, the carbon dioxide can be continuously added in constant or varying amounts, or intermittently added in constant or varying amounts.

In an aspect of the invention, the level of carbon dioxide is changed during the polymerization process (i.e. is altered in situ) to alter the polymer composition. In another aspect of the invention, the level of carbon dioxide used in the presence of the combination catalyst is determined before or after a polymerization run is started or finished respectively. In another aspect of the invention, the carbon dioxide is present during catalyst kills or catalyst transitions.

In an aspect of the invention, the amount of carbon dioxide will be increased to lower the activity of the single site catalyst, which correspondingly decreases the relative amount of high molecular weight component in the polymer composition. In another aspect of the invention, the amount of carbon dioxide will be decreased to increase the activity of the single site catalyst, which correspondingly increases the relative amount of high molecular weight component in the polymer composition.

In an aspect of the invention, the amount of carbon dioxide will be increased to lower the activity of the single site catalyst, which correspondingly decreases the relative amount of low molecular weight component in the polymer composition. In another aspect of the invention, the amount of carbon dioxide will be decreased to increase the activity of the single site catalyst, which correspondingly increases the relative amount of low molecular weight component in the polymer composition.

In an aspect of the invention, the amount of carbon dioxide will be increased to lower the activity of the single site catalyst; which correspondingly decreases the relative amount of a polymer component which has the highest average comonomer content in the polymer composition. In another aspect of the invention, the amount of carbon dioxide will be decreased to increase the activity of the single site catalyst, which correspondingly increases the relative amount of a polymer component having the highest average comonomer content in the polymer composition.

In an aspect of the invention, the process is a continuous polymerization process, and the amount of carbon dioxide present relative to the amount of combination catalyst present can be increased or decreased over time. The level of carbon dioxide present relative to the amount of combination catalyst present is adjusted by controlling the feed rate of carbon dioxide and the feed rate of the combination catalyst to a continuous reactor or reaction zone. More specifically, the feed ratio of carbon dioxide to combination catalyst or to ethylene feed is adjusted. For a continuous polymerization process, the combination catalyst and carbon dioxide are fed to a reactor zone in a continuous manner. Preferably they are fed separately. The feed rates of the combination catalyst and the carbon dioxide can be monitored and adjusted. For example, the feed rate of the combination catalyst may be kept approximately constant while the feed rate of carbon dioxide (sometimes given as the ratio of carbon dioxide to ethylene) is increased or decreased. The reaction zone of the present invention may represent a single reactor, or the reaction zone may represent a reactor which is part of a larger reactor system comprising further reaction zones and reactors.

The use of carbon dioxide as described in the present invention, can be used maintain a consistent polymer product or it may be used to obtain a desired polymer composition by "fine-tuning" a dual catalyst having a fixed ratio of chromium and single site catalysts so that the desired amounts of high and low molecular weight components are formed.

It will be recognized by persons skilled in the art, that changing the ratio of high to low molecular weight components in the polymer composition, by the use of carbon dioxide provides a means to control or adjust the high load melt index $I_{21}$ of the polymer composition. If the target $I_{21}$ of the polymer being produced is not on target, then the amounts of carbon dioxide present may be increased or decreased to change the $I_{21}$ accordingly. For processes in which the single site catalyst produces a polymer component with higher molecular weight than the chromium catalyst and when $I_{21}$ is lower than desired, an increase in the amount of carbon dioxide present will increase the $I_{21}$ (i.e. by decreasing the weight % of the HMW component); alternatively, if the $I_{21}$ of the polymer composition is higher than desired, a decrease in the amount of carbon dioxide present will decrease the $I_{21}$ (i.e. by increasing the weight % of the HMW component). If the chromium catalyst makes a polymer component having a higher molecular weight than the single site catalyst, then the above conditions will be reversed.

In an aspect of the invention, the dual catalyst will contain sufficient amounts of the single site catalyst for the single site catalyst to show activity even when in the presence of carbon dioxide. Using such a dual catalyst formulation allows for the ratio of first to second polymer components to be controlled in both directions. Without wishing to be bound by theory, if insufficient single site catalyst is present or if the single site catalyst is very sensitive to carbon dioxide, then in the presence of any amount of carbon dioxide, the single site catalyst will have little to no activity and the desired polymer composition having a first and second polymer component will not be made.

In an aspect of the invention, the process of the current invention can be used to compensate for fluctuations in the polymerization conditions (e.g. hydrogen concentration, temperature, pressure, comonomer concentration, impurities level, etc.) which may themselves change the $I_{21}$ of the polymer composition, in order to produce polymer compositions with constant performance characteristics. Preferably, the presence of carbon dioxide will affect the ratio of first to second polymer components without affecting the molecular weight performance of each catalyst species of a dual catalyst.

The present invention may be carried out in the following manner: the polymer composition is sampled and analyzed using rheological methods (e.g. melt index measurements, etc.) which are well known in the art; if the polymer composition does not have the desired rheological properties the feed ratio of the combination catalyst to carbon dioxide is adjusted to change the ratio of first and second polymer components (such as for example, high to low molecular weight components); the polymer composition is again sampled and analyzed using rheological methods to determine whether the polymer composition has the targeted properties, and where not, the sequence of adjustment and testing is repeated until the desired properties are achieved. Other non-rheological methods, well known in the art, such as DSC (differential scanning calorimetry), TREF (temperature rising elution fractionation), GPC (gel permeation chromatography), GPC-TREF, GPC-FTIR (gel permeation chromatography with Fourier transform infra red detection) etc., can also be used to determine whether the polymer composition has the desired or targeted properties.

In an aspect of the invention, controlling the relative amounts of first and second polymer components in accordance with the current invention may also be part of a more complex polymer composition regulation protocol. By way of non-limiting example, controlling the ratio of high molecular weight to low molecular weight components by conducting the polymerization in the presence of a dual catalyst and carbon dioxide may additionally comprise the following: i) measuring the ratio of first to second polymer components in the polymer composition or measuring the high load melt index $I_{21}$ of the composition, ii) calculating the amount of carbon dioxide necessary to achieve a prescribed ratio of first to second polymer components or polymer composition high load melt index $I_{21}$, and iii) increasing or decreasing the amount of carbon dioxide present to produce a polymer composition with the desired high load melt index $I_{21}$.

In an aspect of the invention, the level of carbon dioxide in ppm is increased by an amount sufficient to increase the high load melt index $I_{21}$ of the polymer composition by at least 0.1%. In an aspect of the invention, the level of carbon dioxide in ppm is decreased by an amount sufficient to decrease the high load melt index $I_{21}$ of the polymer composition by at least 0.1%.

Suitable monomers which can be polymerized using the process of the current are ethylene for ethylene homopolymerization or ethylene and one ore more alpha-olefins for ethylene copolymerization. Ethylene copolymerization is preferred. Alpha-olefins include propylene, 1-butene, 1-pentene, 1-hexene, 1-heptene, 1-octene, 1-decene or other branched $C_2$-$C_{10}$ alpha olefins such as 4-methyl-1-pentene, conjugated and nonconjugated dienes such as 1,3-butadiene, 1,4-hexadiene or 1,7-octadiene or vinylaromatic compounds such as styrene or substituted styrene. Other alpha olefins include ones in which the double bond is part of a cyclic structure which can comprise one or more ring systems. Examples are cyclopentene, norbornene, tetracyclododecene or methylnorbornene or dienes such as 5-ethylidene-2-norbornene, norbornadiene or ethylnorbornadiene. In a preferred aspect of the invention, ethylene is copolymerized with propene, 1-butene, 1-hexene and/or 1-octene.

The inventive method of polymerizing olefins can be carried out at temperatures in the range from 0 to 250° C., preferably from 25 to 150° C. and particularly preferably from 40 to 130° C., and under pressures of from 0.05 to 10 MPa, particularly preferably from 0.3 to 4 MPa, using all industrially known polymerization processes such as solution, slurry or gas phase processes. Preferably, the invention is carried out in the gas phase or the slurry phase. Optionally, the dual catalyst can also be subjected to a prepolymerization before use in a gas phase or slurry phase process. The prepolymerization can be carried out in the gas phase, in suspension or in the monomer (bulk), and can be carried out continuously in a prepolymerization unit installed upstream of the polymerization reactor or in a discontinuous prepolymerization unit independent of the reactor operation.

Slurry polymerization is well known in the art. The polymerization is conducted in an inert diluent in which the resulting polymer is not soluble. The monomers may be soluble in the diluent. The diluent is typically a hydrocarbyl compound such as a $C_{5-12}$ hydrocarbon that may be un-substituted or substituted by a $C_{1-4}$ alkyl radical. Some potential diluents include pentane, hexane, heptane, octane, isobutene cyclohexane and methylcyclohexane. The diluent may be hydrogenated naphtha. The diluent may also be a $C_{8-12}$ aromatic hydrocarbon such as that sold by Exxon Chemical Company under the trademark ISOPAR® E. Typically, monomers are dispersed or dissolved in the diluent. The polymerization reaction takes place at temperatures from about 20° C. to about 120° C., preferably from about 40° C. to 100° C. The pressure in the reactor may be from about 15 psi to about 4,500 psi, preferably from about 100 to 1,500 psi. The reactors may be stirred tank or "loop" reactors with a settling leg to remove product polymer. The solids content of the suspension is generally in the range from 10 to 80%. The polymerization can be carried out either batchwise, e. g. in stirring autoclaves, or continuously, e.g. in tube reactors, preferably in loop reactors.

In gas phase polymerization, pressures can be in the range of 25 to 1000 psi, preferably 50 to 500 psi, most preferably 100 to 450 psi, and temperatures will be in the range of from 30 to 130° C., preferably 65 to 115° C. Stirred or preferably fluidized bed gas phase reactors can be used. In the phase fluidized bed polymerization of olefins, the polymerization is conducted in a fluidized bed reactor wherein a bed of polymer particles are maintained in a fluidized state by means of an ascending gas stream comprising the gaseous reaction monomer. The polymerization of olefins in a stirred bed reactor differs from polymerization in a gas fluidized bed reactor by the action of a mechanical stirrer within the reaction zone that contributes to fluidization of the bed. The gas phase polymerization may be conducted in dry mode, condensed mode or super condensed mode, all of which are well known in the art. Polymerization takes place in the presence of a non polymerizable gas that may be inert or may be an alkane, or a mixture thereof and typically hydrogen. For a detailed description of gas phase fluidized bed polymerization processes see U.S. Pat. Nos. 4,543,399; 4,588,790; 5,028,670; 5,352,749 and 5,405,922.

It is also possible to use a multizone reactor or a multi reactor system in which at least two polymerization zones or reactors are connected to one another and the polymer is passed alternately a number of times through these zones or reactors, and where each zone or reactor may have different polymerization conditions.

Such a multizone or multi reactor systems include multiple slurry reactors, the mixture of slurry and gas phase reactors or multiple gas phase in series or in parallel reactors. For examples of such reactors see WO 97/04015 and WO 00/02929. In preferred aspect of the invention however, the polymerization process is carried out in a single reactor. The product is removed from the reactor by conventional means and separated from the diluent and/or residual monomers before further treatment.

In the current invention, the dual catalyst system may be fed to a polymerization reactor in a number of ways. For example, co-supported catalyst may be fed to the reactor using one or more catalyst feeders. The supported catalyst components may be fed to a reactor via a dry catalyst feeder or as a slurry in a hydrocarbon or other suitable viscous inert liquid such as but not limited to mineral oil. The catalyst slurry can be fed into the reactor using any suitable liquid delivery system, such as but not limited to a high pressure syringe pump or other displacement device.

In the current invention, carbon dioxide can be fed to a polymerization reactor in a number of ways. For example, the carbon dioxide can be feed as a separate feed gas or combined with another feed stream.

Optionally, scavengers are added to the polymerization reactor. In an aspect of the invention, scavengers are organoaluminum compounds having the formula:

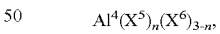

$$Al^4(X^5)_n(X^6)_{3-n},$$

where $(X^5)$ is a hydrocarbyl having from 1 to about 20 carbon atoms; $(X^6)$ is selected from alkoxide or aryloxide, any one of which having from 1 to about 20 carbon atoms; halide; or hydride; and n is a number from 1 to 3, inclusive; or alkylaluminoxanes having the formula:

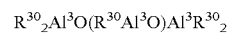

$$R^{30}{}_2Al^3O(R^{30}Al^3O)Al^3R^{30}{}_2$$

wherein each $R^{30}$ is independently selected from the group consisting of $C_{1-20}$ hydrocarbyl radicals and m is from 3 to 50. Preferred scavengers are trialkylaluminum compounds.

Optionally, the scavengers may be independently supported. For example, an inorganic oxide that has been treated with an organoaluminum compound or an alkylaluminoxane may be added to the polymerization reactor. Suitable, inorganic oxides are as described above, with silica being preferred. The method of addition of the organoaluminum or alkylaluminoxane compounds to the inorganic oxide is not specifically defined and is carried out by procedures well known in the art.

EXAMPLES

General Considerations: Melt indexes, $I_2$, $I_5$ and $I_{21}$ for the polyethylene compositions were measured according to ASTM D1238 (when conducted at 190° C., using a 2.16 kg, a 5.48 kg and a 21 kg weight respectively). Polyethylene composition density (g/cc) was measured according to ASTM D792. Molecular weight distribution ($M_w/M_n$) and molecular number and weight averages (Mn, Mw) of resins were determined using high temperature Gel Permeation Chromatography (GPC) according to the ASTM D6474: "Standard Test Method for Determining Molecular Weight Distribution and Molecular Weight Averages of Polyolefins". The system was calibrated using the 17 polystyrene standards (Mw/Mn<1.1) in Mw range $5\times10^3$ to $8\times10^6$ and 2 hydrocarbon Standards $C_{40}$ and $C_{20}$. The operating conditions are listed below:

| | |
|---|---|
| GPC instrument: | Polymer Laboratories ® 220 equipped with a refractive index detector |
| Software: | Viscotek ® DM 400 Data Manager with PL Cirrus ® software |
| Columns: | 4 Shodex ® HT-800/S series cross-linked styrene-divinylbenzene with pore sizes $10^3$ Å, $10^4$ Å, $10^5$ Å, $10^6$ Å |
| Mobile Phase: | 1,2,4-trichlorobenzene |
| Temperature: | 140° C. |
| Flow Rate: | 1.0 ml/min |
| Sample Preparation: | Samples were dissolved in 1,2,4-trichlorobenzene by heating on a rotating wheel for four hours at 150° C. |
| Sample Filtration: | No |
| Sample Concentration: | 0.1% (w/v) |

Preparation of a Group 4 Single-Site Catalyst on an Inorganic Support

Dichloro[(1,2,3,4,5-η)-1-(pentafluorophenyl)-2,4-cyclopentadien-1-yl][P,P,P-tris(1,1-dimethylethyl)phosphine imidato-κN]titanium catalyst, ($Cp\text{-}C_6F_5$)Ti(N=P′$Bu_3$)$Cl_2$ on Sylopol 2408® silica was prepared as per Example 1 of Canadian Patent Application 2,605,077.

Preparation of a Chromium Catalyst on an Inorganic Oxide Support

Sylopol 955® silica, purchased from Grace Davison, was calcined by fluidizing with air at 200° C. for 2 hours and then under a flow of nitrogen at 600° C. for 6 hours. 60 g of such treated silica, 1.94 g of silyl chromate and 480 mL of purified hexanes were added under a nitrogen atmosphere into a 1 L-three neck, round bottom flask equipped with an overhead stirrer. The flask was covered with aluminum foil and the slurry was stirred at 45° C. for 2 hours. The aluminum foil was removed. 9.37 g of a 25 wt % diethyl aluminum ethoxide in hexane solution was added over 5 minutes to the flask. The slurry was further stirred at 60° C. for 2.5 hours. The solvent was removed by vacuum until a vacuum degree of 500 micron was achieved, resulting in a free flowing catalyst powder.

Preparation of a Combination Catalyst 60 g of the silica-supported chromium catalyst prepared above and 262 g of purified hexanes were added under a nitrogen atmosphere into a 1 L-three neck, round bottom flask equipped with an overhead stirrer. While the slurry was being stirred, 37.1 g of a 10 wt % MAO solution in toluene purchased from Albemarle Corporation and 0.213 g of dichloro [(1,2,3,4,5-η)-1-(pentafluorophenyl)-2,4-cyclopentadien-1-yl][P,P,P-tris(1,1-dimethylethyl)phosphine imidato-κN] titanium prepared above were successively added to the flask. The slurry was stirred in dark at 50° C. for 2.5 hours. The solvent was then removed by vacuum until a vacuum degree of 400 micron was achieved.

Example 1 (Comparative)

A 2 L stirred tank reactor was heated at 100° C. for 30 minutes and thoroughly purged with nitrogen. The reactor was then cooled to 90° C. The following components were then successively added into the reactor: 0.56 mL of a 25 wt % tri-i-butyl aluminum in heptanes, 0.031 g of the silica-supported group 4 single-site catalyst prepared as described above, 2 psig nitrogen and 4 mL of 1-hexene. The reactor was subsequently pressurized with ethylene to give a total reactor pressure of approximately 206 psig. During the polymerization, ethylene was continuously fed into the reactor in order to maintain a constant reactor pressure. The polymerization was carried out at 90° C. for 1 hour.

Example 2

Example 2 was carried out analogously to Example 1, except that 20 ppm of $CO_2$ was added to the reactor. Example 2, shows that a supported group 4 single site catalyst (e.g. a supported group 4 single site catalyst having at least one phosphinimide ligand) has significantly reduced activity when polymerization is carried out in the presence of carbon dioxide.

Example 3 (Comparative)

A 2 L stirred tank reactor was heated at 100° C. for 30 minutes and thoroughly purged with nitrogen. The reactor was then cooled to 95° C. The following components were then successively added into the reactor: 0.5 g of Sylopol® 955 silica containing 17.4 wt % triethyl aluminum, 0.26 g of the silica-supported chromium catalyst prepared above, 2 psig nitrogen and 4 mL of 1-hexene. The reactor was subsequently pressurized with ethylene to give a total reactor pressure of approximately 206 psig. During the polymerization, ethylene was continuously fed into the reactor in order to maintain a constant reactor pressure. The polymerization was carried out at 95° C. for 1 hour.

Example 4

Example 4 was carried out analogously to Example 3, except that 20 ppm of $CO_2$ was added to the reactor. Example 4, shows that a supported chromium catalyst (e.g. a supported silyl chromate catalyst) shows only a negligible decline in activity when polymerization is carried out in the presence of carbon dioxide.

Example 5a

This example was carried out analogously to Example 3, except that 187 g of the silica-supported combination catalyst prepared as described above was used instead of the silica-supported chromium catalyst.

Example 5b

Example 5b was carried out analogously to Example 5a, except that 20 ppm of $CO_2$ was added to the reactor. Comparison between Examples 5a and 5b shows that a supported combination catalyst comprising a chromium catalyst (e.g. a silyl chromate catalyst) and a group 4 single site catalyst (e.g. a group 4 single site catalyst having at least one phosphinimide ligand), provides a polymer composition having a lower relative amount of a high molecular weight component (i.e. a decreased ratio of high to low molecular weight components), when the polymerization is carried out in the presence of carbon dioxide, relative to when the polymerization is carried out in the absence of carbon dioxide.

The data for Examples 1-5 are captured in Table 1.

TABLE 1

|  | Catalyst | $CO_2$ (vol ppm) | Activity (g PE/g Cat) | FI ($I_{21}$) (g/ 10 min) | Density (g/mL) | Mn ($\times 10^3$) | Mw ($\times 10^3$) | Mw/ Mn |
|---|---|---|---|---|---|---|---|---|
| Example 1 | group 4 single-site catalyst | 0 | 2,594 | a) | 0.917 | b) | b) | b) |
| Example 2 | group 4 single-site catalyst | 20 | 1,231 | a) | 0.913 | b) | b) | b) |
| Example 3 | chromium catalyst | 0 | 356 | 166 | 0.958 | 9 | 112 | 13 |
| Example 4 | chromium catalyst | 20 | 329 | 139 | 0.960 | 8 | 131 | 17 |
| Example 5a | combination catalyst | 0 | 582 | 18.2 | 0.950 | 12 | 196 | 16 |
| Example 5b | combination catalyst | 20 | 445 | 28.8 | 0.955 | 9 | 180 | 20 | a) too small to measure
b) could not be determined due to poor solubility
note:
volume ppm (ppmv) is the ratio of the volume of $CO_2$ to the total volume of the gases in the reactor in part per million unit; under the polymerization conditions used, $CO_2$, ethylene and nitrogen behave similar to ideal gases; assuming ideal gases, the concentration of $CO_2$ in ppmv is equal to molar ppm.

In the presence of 20 volume ppm $CO_2$, the activity of the group 4 single site catalyst decreased significantly from 2,594 gram polymer/gram catalyst to 1,231 g polymer/g catalyst; whereas little effect was observed on the chromium catalyst activity. The effect of $CO_2$ on the molecular weight ($M_w$, $M_n$) of the resins produced by the chromium catalyst was also insignificant. The molecular weight of the resin produced by the group 4 single site catalyst could not be determined accurately using GPC methods because the resin could not be completely dissolved in appropriate solvents.

For the combination catalyst, the addition of 20 ppm $CO_2$ reduced the catalyst activity from 582 g polymer/g catalyst to 445 g polymer/g catalyst. Based on the data shown in Table 1, the reduction in activity of the combination catalyst in the presence of $CO_2$ can be attributed to the reduction of the activity of the group 4 single site catalyst in the combination catalyst and not to a reduction of the activity of the chromium catalyst.

FIG. 1 shows the GPC plots for the polymers obtained in Examples 3, 5a and 5b. In the absence of $CO_2$, the combination catalyst produced a polymer with clear bimodality. By comparing the GPC data for the resin obtained in Example 5b, with the GPC plot of the resin made in Example 3, and Example 5a, it is clear that the polymer component with a peak in the low molecular weight region is produced by the chromium catalyst, while the polymer component with a peak in the high molecular weight region is produced by the group 4 single site catalyst. When 20 ppm of $CO_2$ was added to the reactor, the polymer component made by the group 4 single site catalyst decreased significantly relative to the polymer component made by the chromium catalyst. In addition, the data show that $CO_2$ had little effect on the molecular weights of each of the polymer components. These results show the ratio of a first polymer component (made by a chromium catalyst) to a second polymer component (made by a group 4 single site catalyst) can be changed by altering the $CO_2$ level in the reactor. In particular the ratio of a second polymer component (of relatively higher molecular weight and relatively higher comonomer content) to a first polymer component (of relatively lower molecular weight and relatively lower comonomer content) has been changed by altering the level of $CO_2$ in a reactor.

The effect of $CO_2$ on the GPC data agrees with the overall effects on polymer composition density, melt index and molecular weight. In the presence of $CO_2$, the density and melt index $I_5$ of the bimodal resin increased while the molecular weight decreased. This was due to a decrease in activity of the group 4 single site catalyst relative to the chromium catalyst: the group 4 single site catalyst produced a polymer component having lower density (with higher co-monomer content), lower melt index $I_5$, and higher molecular weight; the chromium catalyst produced a polymer component having a lower molecular weight, lower co-monomer content and higher density.

Hence, the data shows that alteration of the $CO_2$ levels in a reactor or polymerization zone can be used as a convenient method to control the density, the flow properties, the molecular weight and the relative proportion of the polymer components made by a combination catalyst comprising a chromium catalyst and a group 4 single site catalyst.

What is claimed is:

1. A process to co-polymerize ethylene and at least one co-monomer using a combination catalyst to provide a polymer composition comprising a first polymer component and a second polymer component wherein said process comprises:
controlling the ratio of said first polymer component to said second polymer component by altering the amount of carbon dioxide present;
wherein said combination catalyst comprises:
a chromium catalyst,
a group 4 single site catalyst,
one or more catalyst activators,
and one or more supports;
wherein said chromium catalyst provides said first polymer component and said group 4 single site catalyst provides said second polymer component; and wherein said group 4 single site catalyst has the formula:

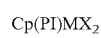

where Cp is a cyclopentadienyl type ligand, PI is a phosphinimide ligand, M is Ti, Zr or Hf, and each X independently, is an activatable ligand.

2. The process of claim 1, wherein lowering the level of carbon dioxide in molar ppm from a first higher level to a second lower level, decreases said ratio of said first polymer component to said second polymer component, and raising the level of carbon dioxide in molar ppm from a first lower level to a second higher level, increases said ratio of said first polymer component to said second polymer component.

3. The process according to claim 2, wherein said chromium catalyst is a silyl chromate catalyst.

4. The process according to claim 3, wherein said combination catalyst is a dual catalyst.

5. The process according to claim 4, wherein said at least one co-monomer is selected from the group consisting of 1-butene, 1-hexene, and 1-octene.

6. The process according to claim 4, wherein said process is carried out in a gas phase.

7. The process according to claim 4, wherein said process is carried out in a slurry phase.

8. The process according to claim 4, wherein said first polymer component has a lower comonomer content than said second polymer component.

9. The process according to claim 4 or 8, wherein said first polymer component has a lower weight average molecular weight than said second polymer component.

10. The process according to claim 4, wherein said dual catalyst is supported on an inorganic oxide.

11. The process according to claim 4, wherein said first polymer component represents from 95 to 25 wt % of said polymer composition and said second polymer component represents from 5 to 75 wt % of said polymer composition.

12. A continuous process to copolymerize ethylene and at least one co-monomer using a dual catalyst to provide a polymer composition comprising a first polymer component and a second polymer component wherein said continuous process comprises:
controlling the ratio of said first polymer component to said second polymer component by conducting said process in the presence of between 0 molar ppm and 500 molar ppm of carbon dioxide; wherein lowering the level of carbon dioxide in molar ppm from a first higher level to a second lower level, decreases said ratio of said first polymer component to said second polymer component, and raising the level of carbon dioxide in molar ppm from a first lower level to a second higher level, increases said ratio of said first polymer component to said second polymer component;
provided that said dual catalyst comprises:
a chromium catalyst,
a group 4 single site catalyst,
one or more catalyst activators,
and a support;
wherein said chromium catalyst provides said first polymer component and said group 4 single site catalyst provides said second polymer component; and wherein said group 4 single site catalyst has the formula:

$Cp(PI)MX_2$ where Cp is a cyclopentadienyl type ligand, PI is a phosphinimide ligand, M is Ti, Zr or Hf, and each X independently, is an activatable ligand.

13. The continuous process according to claim 12, wherein said chromium catalyst is a silyl chromate catalyst.

14. The continuous process of claim 13, wherein said process is conducted in a gas phase reactor.

15. The continuous process of claim 13, wherein said first polymer component has a lower comonomer content than said second polymer component.

16. The process according to claim 13 or 15, wherein said first polymer component has a lower weight average molecular weight than said second polymer component.

17. A process to polymerize ethylene and optionally a co-monomer with a combination catalyst, said process providing a polymer composition comprising a first polymer component and a second polymer component; wherein an activity modifier is contacted with said combination catalyst in an amount sufficient to change the ratio of said first polymer component to said second polymer component; wherein said combination catalyst comprises:
a chromium catalyst,
a group 4 single site catalyst,
and one or more catalyst activators,
further provided that said chromium catalyst is less sensitive to said activity modifier in terms of lost activity than said group 4 single site catalyst; and wherein said group 4 single site catalyst has the formula:

$Cp(PI)MX_2$ where Cp is a cyclopentadienyl type ligand, PI is a phosphinimide ligand, M is Ti, Zr or Hf, and each X independently, is an activatable ligand.

18. The process of claim 17, wherein said activity modifier is carbon dioxide.

19. A process to co-polymerize ethylene and at least one co-monomer using a combination catalyst to provide a polymer composition comprising a first polymer component and a second polymer component, wherein the process comprises:
controlling the ratio of the first polymer component to the second polymer component by altering the amount of carbon dioxide present in a polymerization zone;
wherein the combination catalyst comprises: a chromium catalyst, a group 4 single site catalyst, one or more catalyst activators, and one or more support; and
wherein the chromium catalyst is less sensitive to carbon dioxide in terms of reduced activity than the group 4 single site catalyst and provides the first polymer component; and
the group 4 single site catalyst is more sensitive to carbon dioxide in terms of reduced activity than the chromium catalyst and provides the second polymer component; and wherein said group 4 single site catalyst has the formula:

$Cp(PI)MX_2$ where Cp is a cyclopentadienyl type ligand, PI is a phosphinimide ligand, M is Ti, Zr or Hf, and each X independently, is an activatable ligand.

* * * * *